United States Patent
Helvajian et al.

(10) Patent No.: US 11,643,225 B2
(45) Date of Patent: May 9, 2023

(54) INTERLOCKING, RECONFIGURABLE, RECONSTITUTABLE, REFORMABLE CELL-BASED SPACE SYSTEM

(71) Applicant: The Aerospace Corporation, El Segundo, CA (US)

(72) Inventors: Henry Helvajian, Pasadena, CA (US); Randy Villahermosa, Pasadena, CA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 877 days.

(21) Appl. No.: 15/655,972

(22) Filed: Jul. 21, 2017

(65) Prior Publication Data
US 2019/0023424 A1    Jan. 24, 2019

(51) Int. Cl.
| | |
|---|---|
| *B64G 1/28* | (2006.01) |
| *B64G 1/44* | (2006.01) |
| *B64G 1/64* | (2006.01) |
| *B64G 1/24* | (2006.01) |
| *B64G 1/10* | (2006.01) |

(52) U.S. Cl.
CPC ........... *B64G 1/283* (2013.01); *B64G 1/1085* (2013.01); *B64G 1/244* (2019.05); *B64G 1/443* (2013.01); *B64G 1/645* (2013.01); *B64G 1/646* (2013.01); *B64G 2001/1092* (2013.01)

(58) Field of Classification Search
CPC ........ B64G 1/283; B64G 1/244; B64G 1/443; B64G 1/645; B64G 1/646; H01M 2/0245
See application file for complete search history.

(56) References Cited

U.S. PATENT DOCUMENTS

| | | | |
|---|---|---|---|
| 3,169,725 A | 2/1965 | Berglund | |
| 3,744,739 A | 7/1973 | Weaver et al. | |
| 3,785,590 A | 1/1974 | Wentworth | |
| 4,715,566 A | 12/1987 | Nobles | |

(Continued)

FOREIGN PATENT DOCUMENTS

| | | |
|---|---|---|
| CN | 106516161 A | 3/2017 |
| DE | 102014104695 A1 | 10/2015 |

(Continued)

OTHER PUBLICATIONS

Cubli Page, http://robohub.org/swiss-robots-cubli-a-cube-that-can-jump-up-balance-and-walk-across-your-desk/ (last accessed Jul. 21, 2017).

(Continued)

*Primary Examiner* — James Lee
(74) *Attorney, Agent, or Firm* — LeonardPatel PC

(57) ABSTRACT

Cell-based systems may interlock in a reconfigurable configuration to support a mission. Space systems, for example, of a relatively large size may be assembled using an ensemble of individual "cells", which are individual space vehicles. The cells may be held together via magnets, electromagnets, mechanical interlocks, etc. The topology or shape of the joined cells may be altered by cells hopping, rotating, or "rolling" along the joint ensemble. The cells may be multifunctional, mass producible units. Rotation of cell faces, or of components within cells, may change the functionality of the cell. The cell maybe collapsible for stowage or during launch.

36 Claims, 17 Drawing Sheets

(56) References Cited

U.S. PATENT DOCUMENTS

| | | | |
|---|---|---|---|
| 4,917,215 | A | 4/1990 | Pratt |
| 5,017,820 | A | 5/1991 | Culp |
| 5,104,070 | A | 4/1992 | Johnson et al. |
| 5,305,970 | A | 4/1994 | Porter et al. |
| 5,580,013 | A | 12/1996 | Velke |
| 6,402,624 | B1 | 6/2002 | Larson et al. |
| 6,536,712 | B1 | 3/2003 | Barenett |
| 6,568,638 | B1 | 5/2003 | Capots |
| 6,937,125 | B1 | 8/2005 | French |
| 2002/0066828 | A1 | 6/2002 | Nakamura et al. |
| 2008/0000515 | A1 | 1/2008 | Lin et al. |
| 2009/0078818 | A1 | 3/2009 | Zulkowski et al. |
| 2009/0230250 | A1 | 9/2009 | Wehner et al. |
| 2010/0264256 | A1 | 10/2010 | Yim et al. |
| 2010/0301676 | A1 | 12/2010 | Hernandez et al. |
| 2011/0180669 | A1 | 7/2011 | Johnson et al. |
| 2012/0199697 | A1* | 8/2012 | Nagabhushan ........ B64G 1/286 244/165 |
| 2014/0246544 | A1 | 9/2014 | Bullard et al. |
| 2014/0263844 | A1 | 9/2014 | Cook et al. |
| 2016/0130019 | A1 | 5/2016 | Jaeger |
| 2017/0055381 | A1 | 2/2017 | Tan et al. |
| 2019/0161213 | A1* | 5/2019 | Kreisel .................... B64G 1/10 |

FOREIGN PATENT DOCUMENTS

| | | | |
|---|---|---|---|
| EP | 0541052 B1 | 2/1996 | |
| GB | 2512088 B | 5/2019 | |
| JP | H05330500 A | 12/1993 | |
| JP | 2001253400 A | 9/2001 | |
| JP | 2011240719 | 12/2011 | |
| JP | 2015168422 A | 9/2015 | |
| JP | 2015527860 A | 9/2015 | |
| WO | 2016130669 A1 | 8/2016 | |
| WO | WO-2017194058 A1 * | 11/2017 | ............... B64G 1/12 |

OTHER PUBLICATIONS

DARPA "Satlets" Page, http://spectrum.ieee.org/tech-talk/aerospace/satellites/darpas-satellite-revival-program-gears-up-for-first-launch (last accessed Jul. 21, 2017).

DARPA Hydra System Page, https://www.darpa.mil/program/hydra (last accessed Jul. 21, 2017).

Detailed MIT M-Blocks Page, http://news.mit.edu/2013/simple-scheme-for-self-assembling-robots-1004 (last accessed Jul. 21, 2017).

Edwin A. Peraza-Hernandez, Darren J. Hartl, Richard J. Malak Jr., and Dimitris C. Lagoudas, "Origami-Inspired Active Structures: A Synthesis and Review," Smart Materials and Structures DOI: 10.1088/0964-1726/23/9/094001 (Aug. 2014).

H. Helvajian, "The generation after next: Satellites as an assembly of mass producible functionalized modules," Small Satellites: Past Present and Future, H. Helvajian, S. W. Janson Eds. (AIAA Press, Reston, VA), pp. 815-858 (2009).

M. R. Morgan and R. L. Lang, "Towards developing product applications of thick origami using the offset panel technique," Meeh. Sc. 7, pp. 69-77 (2016).

MIT M-Blocks Page, https://www.technologyreview.com/s/523576/cubes-that-self-assemble/ (last accessed Jul. 21, 2017).

MTRAN3 Robot Page, http://www.robotpark.com/academy/modular-robots-mtran3/ (last accessed Jul. 21, 2017).

Polymorphic Robotics Laboratory Page, https://www.isi.edu/robots/ (last accessed Jul. 21, 2017).

W-M Shen, B. Salemi, P. Will, "Horomone-inspired adaptive communication and distributed control for CONRO self-configurable robots," IEEE Trans. Robotics & Automation, 18(5), p. 700 (2002).

"G Gauge—Cross Clover Eztec Track Layout for Battery Operated Trains" published by Variety Discount, available at https://www.youtube.com/watch?v=6mE-5p4ICNs (Apr. 17, 2017).

"How to build a basic garden railroad, part 1" published by Garden Railways Mag, available at https://www.youtube.com/watch?v=rTpaHKF3-VQ (Apr. 3, 2012).

Invitation to Pay Additional Fees issued in PCT Application No. PCT/US2018/037655 dated Aug. 28, 2018.

PCT/ISA/206 form issued in PCT Application No. PCT/US2018/037651 on Aug. 6, 2018.

NASA SunTower Article, https://science.nasa.gov/science-news/science-at-nasa/2001/ast23mar_1 (last accessed Apr. 4, 2018).

Wikipedia Mobius Strip Article, https://en.wikipedia.org/wiki/M%C3%B6bius_strip (last accessed Apr. 4, 2018).

Blaine R. Copenheaver, "International Search Report & Written Opinion", dated Oct. 18, 2018, PCT Patent Application No. PCT/US18/37651.

International Search Report and Written Opinion issued in PCT Application No. PCT/US 18/37655 dated Oct. 29, 2018.

Patty Inglish, "The First Nation State in Space was Founded in Oct. 2016," available at https://web.archive.org/web/201 61015011116/https://hubpages.com/education/The-First-Human-Nation-State-in-Space-Was-Founded-in-October (last accessed Nov. 2, 2018).

James LEE, "Restriction Requirement", dated May 12, 2020, U.S. Appl. No. 15/945,617.

David Barnhart et al., "Changing Satellite Morphology through Cellularization," AIAA Space 2012 Conference & Exposition, Reston, Virginia (Sep. 11, 2012).

James Lee, "Final Office Action", dated Apr. 15, 2021, U.S. Appl. No. 15/945,617.

Office Action issued in Canadian Application No. 3,070,366 dated Mar. 26, 2021.

Office Action issued in Canadian Application No. 3.070,389 dated Mar. 15, 2021.

Supplementary European Search Report issued in EP Application No. 18836031.7 dated Mar. 11, 2021.

Supplementary European Search Report issued in European Application No. 18834388.3 dated Feb. 26, 2021.

James Lee, "Notice of Allowance", dated Jun. 25, 2021, U.S. Appl. No. 15/945,617.

David Barnhart et al., "Changing Satellite Morphology through Cellularization," American Institute of Aeronautics and Astronautics (Sep. 2012).

First Examination Report issued in NZ Application No. 760992 dated May 11, 2021.

First Examination Report issued in NZ Application No. 760993 dated May 11, 2021.

James Lee, "Non-Final Office Action", dated Oct. 7, 2020, U.S. Appl. No. 15/945,617.

Office Action issued in Canadian Application No. 3,070,366 dated Nov. 18, 2021.

Office Action issued in Canadian Application No. 3,070,389 dated Nov. 10, 2021.

First Examination Report issued in Australian Application No. 2018303551 dated Jul. 7, 2022.

Notice of Acceptance issued in Australian Application No. 2018303552 dated Aug. 19, 2022.

Notice of Grant issued in Japanese Application No. 2020-524713 dated Aug. 3, 2022.

Office Action issued in Canadian Application No. 3,070,389 dated Aug. 24, 2022.

Examination Report issued in Australian Application No. 2018303552 dated Jul. 8, 2022.

Notice of Acceptance issued in New Zealand Application No. 760992 dated May 11, 2022.

Notice of Acceptance issued in New Zealand Application No. 760993 dated May 11, 2022.

Office Action issued in Japanese Application No. 2020-524712 dated Jul. 4, 2022.

Second Examination Report issued in New Zealand Application No. 760992 dated Nov. 1, 2021.

Third Examination Report issued in New Zealand Application No. 760992 dated Mar. 4, 2022.

Examination Report issued in European Application No. 18834388.3 dated Nov. 15, 2022.

* cited by examiner

810

INTERLOCKING, RECONFIGURABLE, RECONSTITUTABLE, REFORMABLE CELL-BASED SPACE SYSTEM

FIELD

The present invention generally pertains to space systems, and more particularly, to cell-based space systems that interlock and reconfigure the ensemble topology, and/or redirect the orientation of multiple payloads.

BACKGROUND

In the past 60 years, space systems have matured to the point that they are a strategic necessity for governments and a commercial boon for the communications and entertainment service industries. More industrial applications are expected to follow. Examples of the current success stories are numerous and well documented. Leaving aside the scientific missions, many current and future space applications would be enhanced if the space systems were larger (e.g., more transponders, higher power beams, more aperture, etc.). However, increasing space system size as a monolithic entity has various drawbacks, including: (1) increasing size requires an ever larger and more costly launch vehicle, (2) larger monolithic entities serve as a larger target for nefarious activity; and (3) the failure of a critical subsystem can render the very large and expensive unit inoperative, requiring an even more expensive servicing mission.

In the past 20 years, there has been a slow but increasing development of small satellite technology. The technology has leveraged the miniaturization of electronic systems to its advantage. The current batch of CubeSats, NanoSats and MicroSats are now far more capable than would have been thought possible decades ago. Moreover, with the miniaturization of consumer electronics, perhaps best evident in the modern laptops and the cell phones, along with the reliabilities that these systems now enjoy, have prompted some space system designers to explore the possibility of assembling space structures, in space, by sequential addition of small but mass producible modules. See H. Helvajian, "The generation after next: Satellites as an assembly of mass producible functionalized modules," Small Satellites: Past Present and Future, H. Helvajian, S. W. Janson Eds. (AIAA Press, Reston, Va.), p. 815 (2009).

A similar trend is evident in the field of reconfigurable robotics (also called polymorphic robotics). While some reconfigurable robotics have been demonstrated for terrestrial applications, there have been no such demonstrations in space. Recently, the Defense Advanced Research Project Agency (DARPA), under the Phoenix program, funded a small California company (NovaWurks™) to develop and demonstrate a scheme for assembling a series of square shaped tiles in space (called "Satlets") as a means to show assembly. The tiles showcase a docking mechanism with no obvious payload.

However, this and other technologies lack the ability to facilitate space system assembly on a "block-by-block" basis, as well as to modify the functionality of individual blocks on the fly, or to remove and replace defective modules. Accordingly, an improved reconfigurable space system may be beneficial.

SUMMARY

Certain embodiments of the present invention may be implemented and provide solutions to the problems and needs in the art that have not yet been fully solved by conventional space systems. For example, some embodiments pertain to cell-based space systems that interlock and reconfigure the ensemble topology, and/or redirect the orientation of multiple payloads. The type of space system architecture in some embodiments may include a cell-based set of interlocking units that can operate individually or in an ensemble together to facilitate radical changes in the interlocked system topology and/or in the choice and combination of payloads that can be directed to concentrate toward a particular mark, for instance. Certain embodiments may include a set of interlocking units that operate individually or in an ensemble, but where specific units serve as deployment sources for larger structures that unfold (e.g., origami-style). Consequently, numerous space missions can be supported by such changes in configuration. Some embodiments include a deployable structure. Certain embodiments may be flattened for stowage or launch.

In an embodiment, a cell includes a frame including a connection mechanism configured to facilitate connection of the cell with at least one other cell to enable assembly of larger structures based on a plurality of conjoined cells. The cell also includes a plurality of components housed within and/or attached to the frame. The plurality of components include a camera, a sensor that extends, a light source, a radio frequency antenna, a laser telemetry transceiver, a transceiver, a thermometer, a radiation detector, a spectrometer, reaction wheels, an attitude determination and control system (ADCS), processing circuitry, a solar array, a single pixel image counter, a photon counter, a payload (e.g., a star tracker, a robotic arm, etc.), or any combination thereof.

In another embodiment, a cell includes a frame comprising a connection mechanism configured to facilitate connection of the cell with at least one other cell and a rotatable component housing that is connected to the frame, but is also configured to rotate about at least one axis. The cell also includes a plurality of components located on the rotatable component housing at different locations from one another. The plurality of components includes a camera, a sensor that extends, a light source, a radio frequency antenna, a laser telemetry transceiver, a transceiver, a thermometer, a radiation detector, a spectrometer, reaction wheels, an attitude determination and control system (ADCS), processing circuitry, a solar array that unfurls and can be retracted, a single pixel image counter, a photon counter, a payload, or any combination thereof. Rotating the rotatable component housing orients each component in a new orientation.

In yet another embodiment, a cell includes a frame including a plurality of rails and/or motion-control guides (e.g., electromagnets, laser light, etc.). The cell also includes a connection mechanism including a plurality of tractors configured to move along a respective one of the plurality of rails and/or motion control guides. The plurality of tractors are configured to facilitate connection of the cell with at least one other cell.

In still another embodiment, a cell includes an at least partially transparent outer sphere including a connection mechanism and an at least partially transparent inner sphere located within the outer sphere. A plurality of components are housed within the inner sphere. The outer sphere and the inner sphere include a plurality of electromagnets configured to rotate the inner sphere when at least some of their polarities are switched such that orientations of the components may be changed. The connection mechanism is configured to connect the cell with at least one other cell is located on an outside of the outer sphere.

In another embodiment, a cell includes a plurality of nested rings comprising an outermost ring and an innermost ring. The cell also includes a power and control structure nested within the innermost ring and connected to at least one of the plurality of nested rings. The outermost ring and the innermost ring include at least one respective motor configured to separately rotate the respective ring when controlled by the power and control structure. The outermost ring includes a connection mechanism configured to connect the cell with at least one other cell.

In yet another embodiment, an ensemble includes a plurality of cells. Each cell includes a frame including a connection mechanism configured to facilitate connection of the cell with at least one other cell and a plurality of components housed within, or connected to, the frame. The plurality of components housed within or connected to the frame of the cell include a camera, a sensor that extends, a light source, a radio frequency antenna, a laser telemetry transceiver, a transceiver, a thermometer, a radiation detector, a spectrometer, reaction wheels, an attitude determination and control system (ADCS), processing circuitry, a solar array, a single pixel image counter, a photon counter, a payload, or any combination thereof. Each cell also includes a "flight" computer configured to control flight and mission operations of the particular cell and at least some functions of the interconnected ensemble. The flight computers of the plurality of cells in the ensemble are configured to control the plurality of cells to arrange themselves to perform a desired mission of the ensemble.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 7B is shown in the stowed configuration. In the open configuration, it resembles what is shown as in FIG. 4B, with three nested rings supporting a center structure in the middle (not shown in FIG. 4B).

FIG. 10 also illustrates an array of deployed nested spheres or rings, similar to FIG. 7A or 7B.

DETAILED DESCRIPTION OF THE EMBODIMENTS

Figure 1:
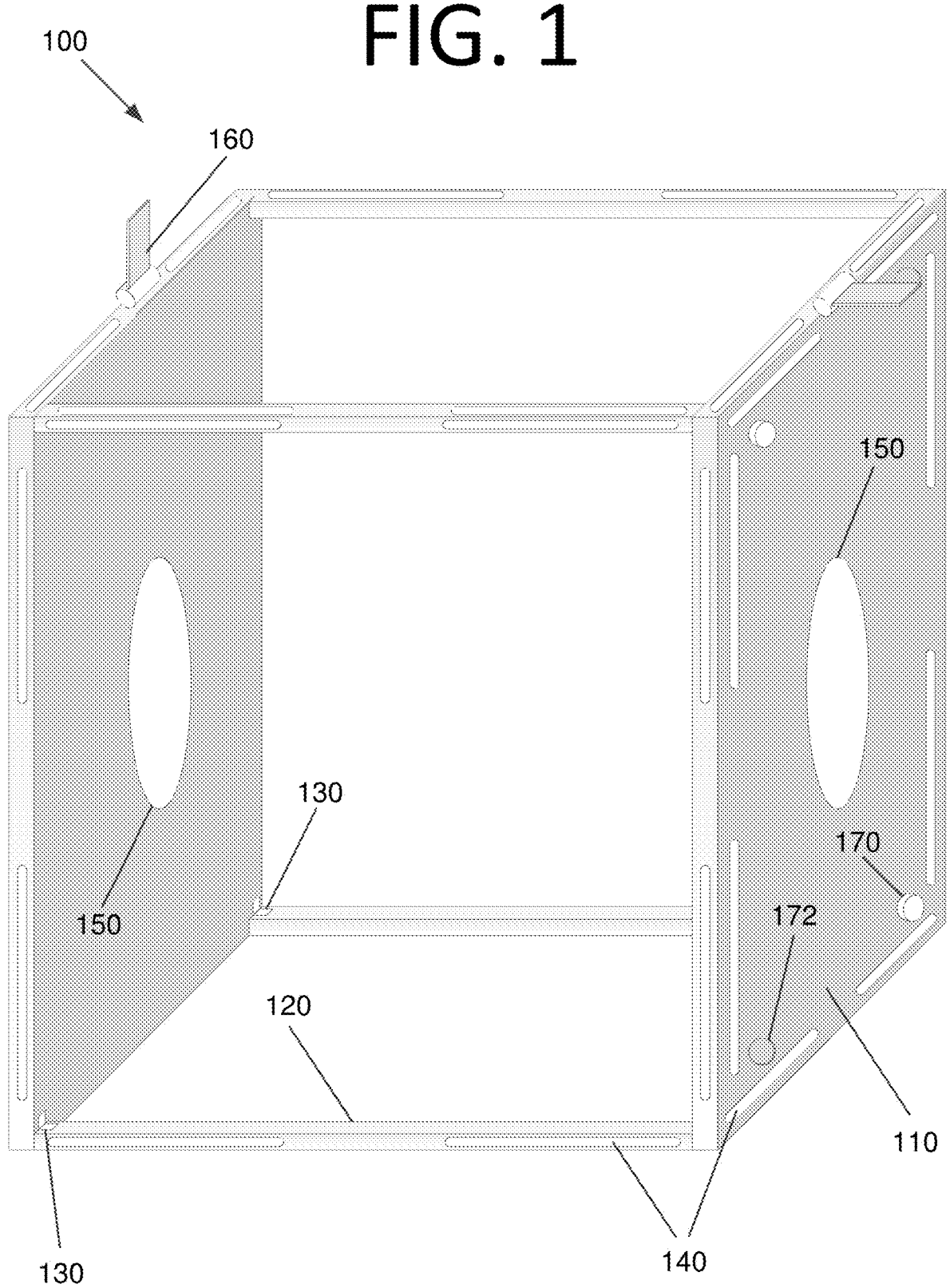
FIG. 1 is a perspective view illustrating a frame of a box-shaped cell, according to an embodiment of the present invention.

Some embodiments of the present invention pertain to cell-based space systems that interlock and can change configuration to support a mission. In some embodiments, cells include microelectromechanical system (MEMS) inertial sensors, high torque motors, small reaction wheels, high energy storage batteries, nonlinear control systems, miniature magnetics, direct current (DC) brushless "flat motors," and microprocessors. Disturbances caused by ensemble or individual cell maneuvers could be mitigated by existing control systems technologies. In cube-shaped cells, in some embodiments, the power cost to introduce a 90° rotation in space may be approximately 25 milliwatts (mW).

Space systems of a relatively large size may be assembled using individual "cells", which are individual space vehicles themselves, but also have the capability for individual action within an ensemble of multiple cells. The cells may be held together via magnets or electromagnets in some embodiments. In certain embodiments, the cells may mechanically interlock with one another via a releasable mechanism driven by a motor or actuator. In some embodiments, some cells may use magnets to interlock and others may use mechanical interlocking mechanisms. The latter may be stronger and may support larger structures. In some embodiments, mechanically connected cells may form a support structure within the space system that supports other cells and provides the ability to build even larger space systems than magnets alone may allow. Applicants of cell-based systems include, but are not limited to, synthetic aperture radar (SAR) missions (e.g., X, Ku, and possibly C bands), reconfigurable optical telescopes in low Earth orbit (LEO), a reconfigurable multi-sensor mission for planetary investigation from space, an imaging space platform with extra-large oblique viewing capability (~360 degrees), a multi-sensory imaging platform that can be mounted on current satellites for increased situational awareness normal to the ground track, and/or a terrestrial application of a multi-sensory wall for security applications. In certain embodiments, segments of the ensemble could be detached and made to re-enter the Earth's atmosphere (if in an Earth-orbiting mission) to bring samples produced in space or captured in space back to Earth. In some embodiments, the cells may also be mounted on a superstructure, truss, or another platform for increased stability for missions in geostationary orbit (GEO) or farther out (e.g., space Lagrange points), for example.

The cells may be multifunctional (e.g., multiple payloads, multiple uses, etc.), mass producible units in some embodiments. This differs from many conventional space systems, which are custom built per unit and may be approximately the size of a car or even a bus. Different cells or different groups of cells may have different functionalities in some embodiments. Different cells or different groups of cells that are not necessarily adjoining may function as a single entity in some embodiments.

In multifunctional embodiments, one or more cells, attached to other cells, may rotate a functional "face" in a particular direction without undocking. This may be a three-dimensional set of components supported within a frame that rotate to expose a certain component (e.g., a camera, radio frequency (RF) antennas, a solar array, a single pixel image counter, a photon counter, etc.). In certain embodiments, at least one component may be a deployable component that extends outward from the frame when deployed. For instance, if the component is an antenna, the antenna may deploy out from the frame and unfold to provide better transmitting/receiving performance, to increase gain, etc. The deployable component may also be a telescope that extends from its stowed configuration for higher resolution, or solar panels that extend and unwrap to provide a larger spatial area of service.

Alternatively, in some embodiments, each face may have different functionality and the cell itself may be physically rotated to orient the desired face on the reconfigurable space system. For instance, one face may include propulsion, another face may include communications, another face may include photovoltaics, another face may include a camera, another face may include other payloads or graspers, etc. The rotation of the face may be accomplished via reaction wheels (e.g., similar to the subsystem that determines and changes spacecraft attitude—the attitude determination and control system (ADCS)), electromagnets using the Earth's magnetic field as a reference, a simple motor (e.g., pancake or brushless flat motors), a combination thereof, or any other suitable mechanism or combination of mechanisms without deviating from the scope of the invention. In the case of reaction wheels, rotation may be rapidly initiated, or a direction of rotation may be rapidly reversed, or rotation may be rapidly braked, to "snap" the cell free from its current interlock. In some embodiments, cells may have one or more ion thrusters or any other suitable propulsion mechanism either currently existing or newly invented in order to propel them, in a free-flying maneuver, about the space system and to interlock in a new position and/or orientation.

At least some faces of the cells are planar in shape in some embodiments to support devices that are fabricated using planar or 2D technology (e.g., electronics, solar cells, etc.). However, faces need not be planar in some embodiments. The face form (or topography) should generally follow the function. For example, in the case of a communications face, it could be a patch antenna, but could also have the shape of a dish or an antenna that is deployable from the face. An inverted dish may make more sense for the propulsion face to allow for thrusters with an off-axis thrust component.

Fundamentally, the topology of a face should follow the fabrication technology used to make the devices that will be on that face. Moreover, each face can be fabricated out of a material that best suits the space system function of that face and the fabrication technologies most relevant to make it in some embodiments. For example, the fabrication of a communications dish need not necessarily be out of a machined metal, but could be made out of glass/ceramic material using plastic forming technology, thin bendable glass (e.g. Corning Willow™ glass), low temperature expansion glass (e.g., Schott Zerodur™ glass) or a 3D printed netting structure that supports a finely knitted metallic mesh. Consequently, each face may have different shapes and be fabricated out of different materials.

The faces may be attached to a core structure about which they rotate. The structure of the core may define the ultimate shape of the cell. The cells may have a prismatic shape, but this shape need not be a cube. Cell capabilities are easier to describe using a cube shape, however, and reference is often made thereto herein for ease of illustration and conceptualization. It should be noted that prismatic cells may be desirable because they may contain batteries and battery capacity scales volumetrically, as does propellant. The design and shape of the core structure may be important because not only does it serve as an attachment point of the faces and enable rotation, but it is also the "conduit" by which power, fuel, control signals are transferred between faces (if necessary) and to other attached modules in some embodiments. However, in certain embodiments, cells may not exchange communications, fuel, heat, power, etc. with one another via a fixed connection.

Consequently, cells may be "active" (e.g., can exchange matter, perform communications, and can ADD or SUBTRACT themselves to/from an ensemble), "passive" (e.g., can exchange matter, perform communications, but can NOT ADD or SUBTRACT themselves to/from the ensemble), or "blocking" (e.g., serve as isolators, block all transfer, etc.). The type and function of the cells (e.g., active, passive, or blocking) may be determined by software control and/or hardware control. Moreover, these capabilities may have a timeframe in some embodiments.

Some embodiments employ a scheme for sharing power, data, and propellant among the modules of an interconnected cell space system. Sharing or having the capability to transfer critical sources enables the space system to be far more resilient to "point defect" failures. This advantage, however, also places a burden on the design of the core structure. For example, a simple 3×3 Rubik's cube has a core structure or yoke that resembles three pipes welded to form the shape of a 3D cross that touch the 6 cardinal points. Attachment to such a structure enables rotation about two axes. Cells of some embodiments, only rotate about one axis because each "face" is intended to rotate as whole. However, rotation about two or more axes may be enabled, perhaps akin to a 3×3 or higher order Rubik's cube.

By way of example, a cube-shaped cell is described in the following paragraphs. Faces A, B, C, and D may rotate about one axis (arbitrarily labeled as the x-axis). The other two axes, labeled as the y-axis and z-axis, also rotate, but serve as conduits for electrical and other resources to faces A-D. Faces E and F are parallel to each other and the ABCD rotational plane in this embodiment. While faces ABCD move as a whole in this embodiment, faces E and F are fixed except for the centers, where an x-axis spar is attached that can rotate. This rotatable joint and its attachments are a unique element of some embodiments. The rotatable spar (i.e., x-axis) may serve to: (a) align a particular face with a cardinal point; (b) rotate a portion of face E and F for aligning the shared service utility lines to the conjoining cell; and (c) provide a counter-rotation torque force, and thereby enable rotations within a single cell without inducing a rotational attitude change to the body of the interconnected cells.

The joint in this embodiment includes a direct-drive rotatable shaft that has a center hole and where the stator or motor housing is placed on the circumference. This technology is routinely used in the development of precision rotary stages that can operate in vacuum. Three of these rotary stage motors may be necessary in some embodiments (with various levels of precision)—all stacked in a collinear fashion and connected at the non-rotating attachment points. The combination rotation stage may also be bolted to the frame module that has clear/open faces and houses the rotating cell. For example, a 10×10×10 cm cube shape cell may have a cube shaped frame with dimensions 11×11×11 cm. The frame may have multiple electromagnetically driven quick release pins (e.g., Ball-Lok™ used in space) per face on the attachable faces (i.e., E and F). The pins may serve to lock a cell to an ensemble (e.g., a cell array). The frame may serve as a reference structure from which rotational (i.e. face, service-line connector) movements are performed. The frame may contain a relatively small number of batteries and include solar cells on edges of each face in some embodiments. The batteries powered by the solar cells may drive the rotational stages.

Of the three rotational stages mentioned above, the outer stage (closest to the frame module) may be designed to rotate the service line connectors (e.g., power, fuel, command and control, etc.) to align with the service connectors of an adjoining cell. This capability may allow a single cell within a connected ensemble to have a different face pointing in a particular direction. The second rotation stage that is attached to the first stage may be designed to rotate the x-axis spar (i.e., rotation of the face). The third rotation stage may be a high torque, fast motion stage, primarily used to provide a counter torque during the movement in the first and second stages. The combination as described allows a single cell to rotate one of four faces (ABCD) about an x-axis without the need to decouple from an ensemble. The service lines housed in the x-axis spar may be built on a flexible connector designed to move 180 degrees in each direction. This technology is available in the automated multi-axis motion industry and is called a "cable management system".

Various ways to build cell-based systems are possible. For instance, in an embodiment, such a system may be built as follows: (1) Take a 1U CubeSat (10×10×10 cm) and define an axis of rotation. Arrange each face about this axis of rotation (ABCD) with a particular space having a particular system function (e.g., communications, propulsion, power, etc.); (2) Include all command and control systems cards used for the 1U CubeSat; (3) Run secondary service lines (power, fuel, command and control, communications, etc.) out of faces E and F, which will be bolted to the rotating spar. Another set of secondary service lines (e.g., power, fuel, command and control, communications, etc.) could be established on one of the ABCD faces to provide service to a cell that is not joined collinear with other cells. The secondary service lines go through electronic switches and valves to isolate a cell, if necessary; (4) Attach a tube to the center of faces E and F to carry the service lines and also serve as a supporting spar; (5) Attach the rotational stage that provides the counter rotational stabilization torque to the end of the tubes on either face E or F. Define this as face F; (6) Attach to the other tube end face (i.e., face E) the rotational stage that moves the x-axis spar (i.e., rotates the faces ABCD); (7) Connect the rotational stage to move and orient the service line connectors on the rotational stage mounted on face E; (8) Build an 11×11×11 cm or larger cube frame structure that includes batteries (mounted inside and near the frame scaffolding. The larger cube frame may have a "barn door" opening on one side to allow insertion of the 1U CubeSat within the cube frame; (9) Mount the 1U CubeSat into the frame, making the final connections of the frame to the fixed attachments for rotational stages mounted at tube ends on face E and F; and (10) Attach and connect the solar cells on the frame to the battery and control system used to drive the rotation motors. The resulting system, using the cube shape as an example, should appear as a cube within a cube and have the functionality as described above. The choice of materials used to fabricate the external cube depends on the number of cells that will be conjoined and the strength and stiffness requirements, but it could be made out of metal, a composite material, and for some applications, high strength plastic. It is envisioned that the frame could be fabricated using 3D manufacturing technology, which may include the "barn door" joints and holders for the quick release pins, etc.

In the above description, one embodiment is presented and described with respect to how to rotate about an arbitrary axis (e.g., the x-axis). It is important to note, however, that every rotation about an axis must be simultaneously countered by an opposite or counter-rotation maneuver to keep the outer frame or total ensemble of joined cells (i.e., satellite systems) from rotating in space. The counter-rotation maneuver (i.e., about the same axis as the first rotation maneuver) can be administered within another adjoining cell, for example. However, it may be more efficient (i.e., provide less overall disturbance) if the counter-rotation is initiated with the cell that induced the first rotation.

FIG. 1 is a perspective view illustrating a frame 100 of a box-shaped cell, according to an embodiment of the present invention. Frame 100 is open on four of its six sides in this embodiment, allowing components (see FIG. 2) within frame 100 to rotate to any of the four open faces. This architecture allows most of the volume defined by frame 100 to be used for housing internal components. Frame 100 may be constructed from any suitable material for operation in space, such as carbon fiber, silicon carbide, metals, alloys, combinations thereof, etc., without deviating from the scope of the invention. Moreover, frame 100 may be fabricated using planar fabrication techniques and then folded into a cube (as in this embodiment) using origami/kirigami techniques.

Frame 100 includes two solid walls 110 and four supports 120 located at each inner corner of walls 110. Hinges 130 connect supports 120 to walls 110 in this embodiment such that frame 100 can be at least partially collapsed to reduce volume and be packed into a launch vehicle prior to deployment, if the internal payload permits. Partially collapsed frames are more likely to occur for complex, non-cubic frame shapes that unfold origami style. Indeed, if the purpose of the given cell is only to provide structural support (i.e., no internal cube), frame 100 may be completely collapsed and deployed upon orbit to a box configuration via motors or actuators (not shown). Alternatively, in some embodiments, the frame may be rigid and supports 120 may be physically attached to, or integrally constructed with, walls 110.

Walls 110 and supports 120 each include magnets 140. In this embodiment, two (permanent or electromagnetic) magnets 140 are located on each outwardly facing edge of the faces of walls 110, and two magnets 140 are included on the outwardly facing thin sides thereof. Similarly, two magnets 140 are located on each outwardly facing side of supports 120. Magnets on different faces may have different polarities such that interlocking with frames of other cells is possible. For instance, magnets 140 of the outward face of one wall may have a north polarity and those of the outward face of the other wall may have a south polarity. This would allow outward faces with opposite polarities to interlock. Walls 110 also each include an electromagnet 150 in this embodiment that may facilitate a stronger connection.

At some point, magnetism may no longer be sufficient to hold cells together. To address this issue, in this embodiment, frame 100 further includes rotatable mechanical locks 160 that are driven by an actuator and include a latch extending therefrom. Here, mechanical locks 160 are only located on one side of frame 100. To securely interlock with another cell, the cells would be positioned such that mechanical locks 160 are opposite one another. The cells would then close their respective latches, securing them together. Mechanical locks in some embodiments may be any suitable locking mechanism and may be used in any number and at any suitable location(s) without deviating from the scope of the invention. For instance, in some embodiments, mechanical locks may be on two sides of walls 110 such that cells may be secured along four edges.

Another approach to induce more secure interlocking, in lieu of mechanic latches, is the implementation of the ball bearing type locking mechanism used in space systems today (e.g., Ball-Lock™). The concept implements a male-female interlocking mechanism that is spring-loaded. A spring-loaded pin 170 with a ball bearing lock is located near edges of frame 100 and inserts into a shallow indent on the adjoining cell. Similarly, spring-loaded pins from other cells insert into shallow indents 172 of frame 100.

Each cell may have both male and female type receptacles to enable interlocking with adjoining cells on any face. This type of interlocking mechanism, along with modified versions (e.g., jewel and indent), not only provides more secure interlocking, as for example when the space system includes a large number of cells (e.g., 100), but also may provide more precise alignment for particular space system missions when the relative alignment of adjoined cells must be more precise (e.g., optical missions, where there are multiple optical imaging sensors that must be co-aligned to optical wavelength accuracies).

The joining of cells may also require that the cell-to-cell interface not only provide mechanical stiffness, but also serve as a conduit for efficient thermal or heat transfer. For example, in some embodiments where there is an N×N array of joined cells, the surrounded cells in the middle should dispose of or transfer their generated heat to the cells and/or faces that have better "contact" with outer space for radiative cooling. The type of thermal heat transfer depends on the array size and the primary mission. For example, a synthetic aperture radar (SAR) mission will typically generate significant heat as result of the radar generator, while an optical sensing mission (e.g., a weather satellite) will typically generate less heat.

Thermal simulations show that passive heat transfer between two efficient thermal conducting surfaces (e.g., metals) will be adequate for most low heat missions and/or orbits with less exposure to the sun. For these missions, the thermal interface may require that the joining face be in firm contact (i.e., no air gap) or the use of a high thermal conductivity material at the interface. For missions where each cell generates large amounts of heat or the ensemble is in an orbit that is in continuous view of the sun (e.g., sun synchronous, dawn/dusk orbits), the frame as shown in FIG. 1 may be more complex, having slightly thicker walls to enable active cooling technology to be utilized. These technologies may include microheat pipes that are machined or placed in the frame with phase change materials that transfer the heat from hot to cold areas, or more sophisticated technologies with a heat transfer fluid and pumps or a high thermal conductivity material like carbon nanotubes.

Figure 2A:
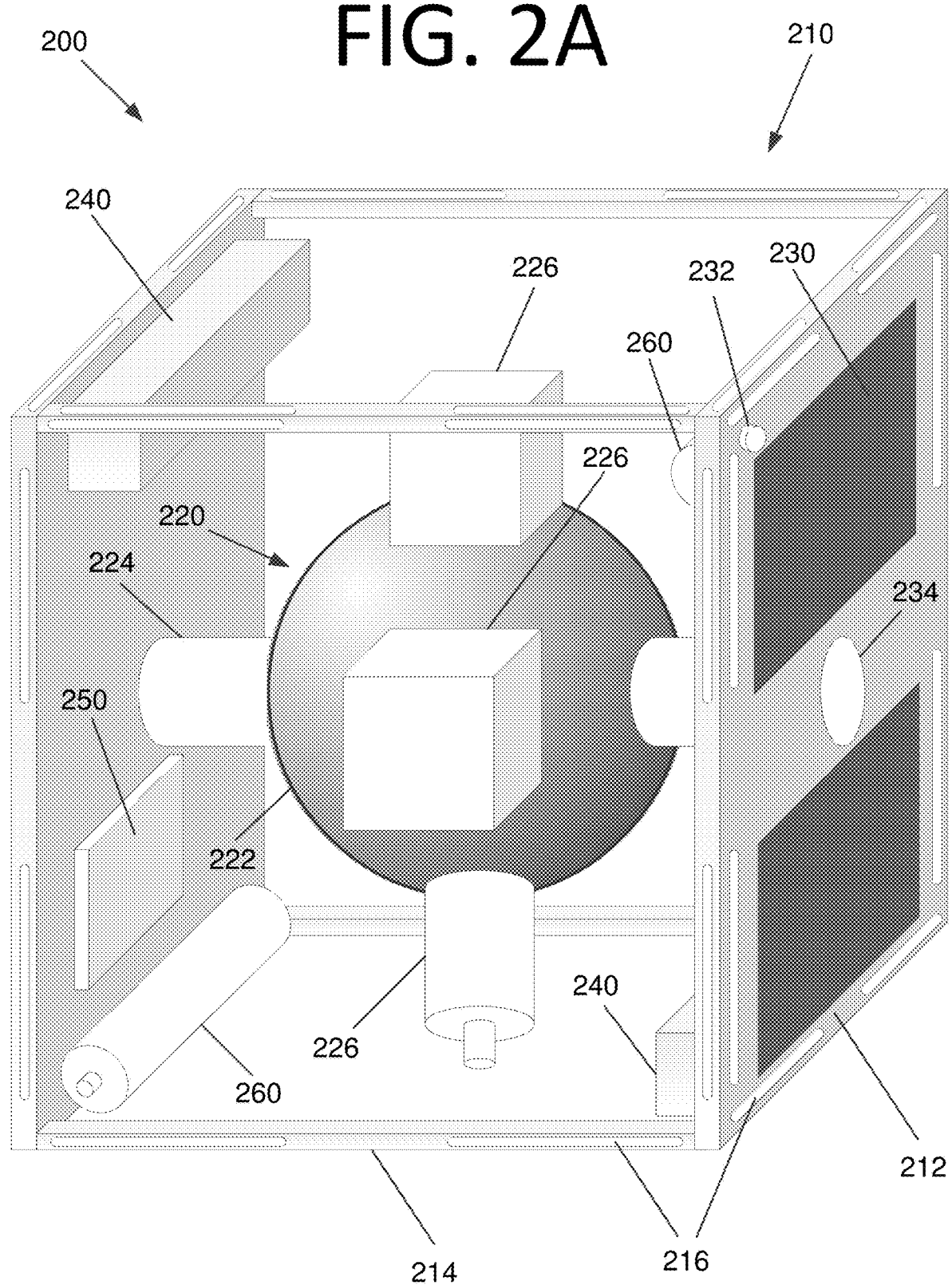
FIG. 2A is a perspective view illustrating a cell, according to an embodiment of the present invention.

FIG. 2A is a perspective view illustrating a cell 200, according to an embodiment of the present invention. Cell 200 includes a frame 210 and a rotatable component housing 220 Similar to frame 100 of FIG. 1, frame 210 includes two walls 212 (shown as a left wall with the face obscured and a right wall with the face visible). While walls 212 are shown as different from one another here, in some embodiments, walls 212 may be identical, similar to FIG. 1. This may make cells more flexible and easier to interconnect.

Walls 212 are connected by supports 214. Two magnets 216 are located on each outwardly facing edge of the faces of walls 212, and two magnets 216 are included on the outwardly facing thin sides thereof. Similarly, two magnets 216 are located on each outwardly facing side of supports 214.

Component housing 220 includes a main body 222, shown as spherical in shape in this embodiment (but any suitable shape may be used in other embodiments), that is connected to walls 212 via supports 224, about which main body 222 rotates. Various components 226 are located on main body 222. These may be any suitable component including, but not limited to, cameras, RF antennas, transceivers, thermometers, radiation detectors, novel sensors, light sources, spectrometers, reaction wheels, an ADCS, processing circuitry (e.g., a processor, a central processing unit (CPU), a field programmable gate array (FPGA), an accelerator (e.g., a graphical processing unit (GPU), etc.), or any other component or combination of components without deviating from the scope of the invention. One or more components may be deployable in some embodiments. For instance, an antenna may be extended and retracted, a solar array may be unfurled and retracted, etc.

Per the above, in this embodiment, main body 222 rotates about supports 224. While single axis rotation is shown here, multi-axis rotation is provided in some embodiments. Each component 226 of main body may be oriented to face in a direction of one of the four open faces, although any orientation about the axis of rotation may be achieved. For instance, if component 226 currently on top of main body 222 is desired to face outwardly towards the open front face, main body 222 may rotate 90° in a downward direction relative to the figure.

In this embodiment, cell 200 also includes various other useful space vehicle features. For instance, cell 200 may receive and store solar power via solar cells 230 and batteries 240 (which are located opposite to one another in this embodiment—this may be beneficial for weight balancing purposes). If another cell interlocks with right wall 212, power may be provided to, or received from, that cell via power connector 232. Right wall 212 also includes an electromagnet 234 to facilitate a connection with an adjacent cell. Cell 200 also includes a flight computer 250 for controlling flight and mission operations and thrusters 260, which include a propellant tank and a valve, to provide propulsion.

The location of the thrusters depends on the utility. Here, thrusters 260 are located opposite to one another on the upper left and lower right of cell 200 to perform the rotation/counter-rotation maneuvers discussed above. If the thrusters are to be used for guiding the cell to a particular location, the thrust vector should go through the center of mass of the vehicle (not as shown). However, if the thrusters are to be used in cell unit disposal (to higher orbit if in GEO, or to lower orbit if in LEO) then the thrusters may be placed as shown in FIG. 2A.

In some embodiments, end-of-life processes for a cell are implemented. In the case of a cell failure, for example, the satellite system may initiate a process to undock the failed unit from the cell ensemble. The failed cell may be allowed to briefly drift away, and then a high $I_{sp}$ small rocket may be fired to propel the failed cell either toward the Earth (and subsequent burn up) if in LEO or to satellite disposal orbits (super GEO) if in GEO. The ensemble may then reconfigure its topology to fill the space of the missing cell, and another new cell may be added from the edge.

Figure 2B:
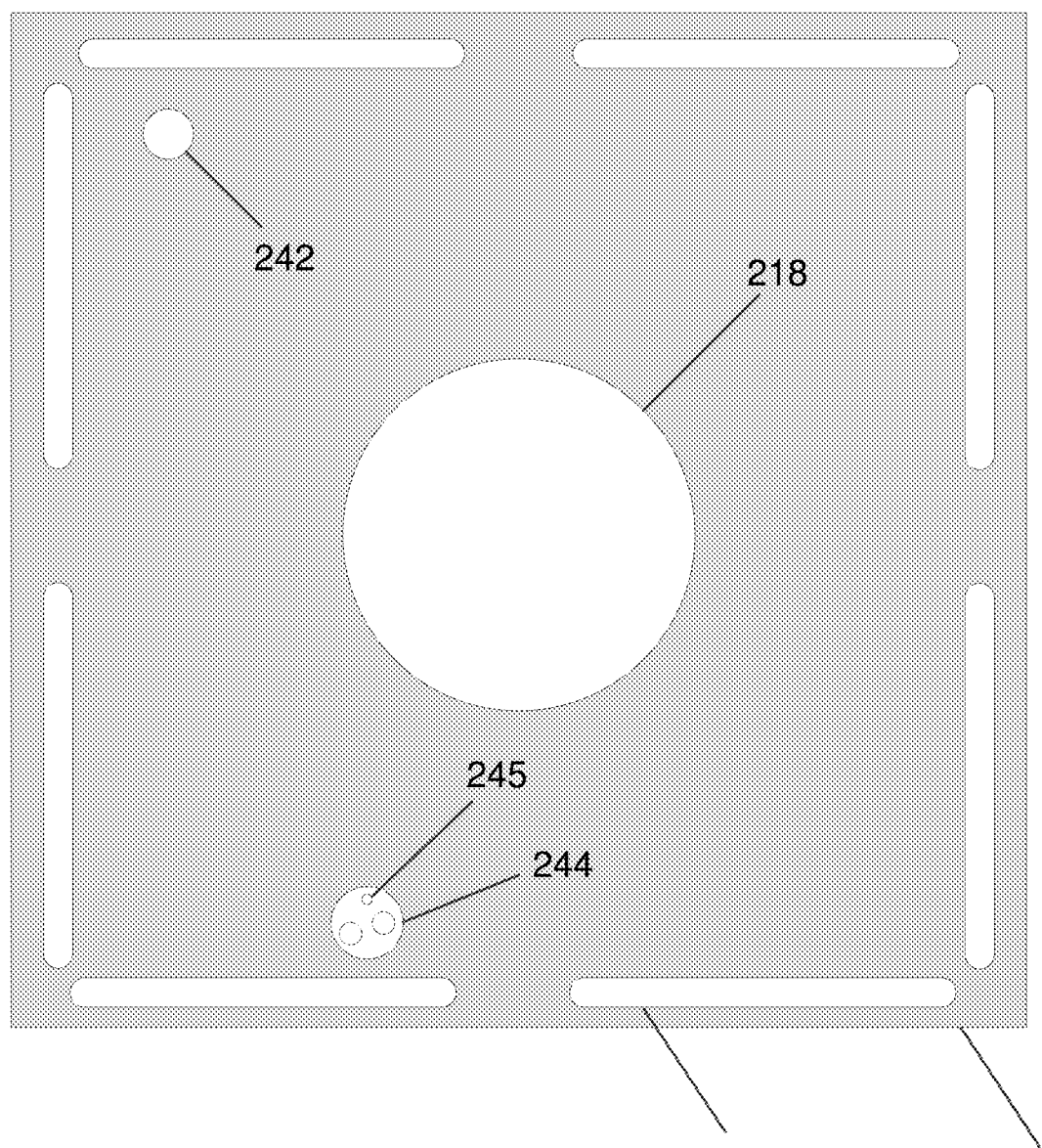
FIG. 2B is a side view illustrating a face of the left wall of FIG. 2A that is not visible in that figure, according to an embodiment of the present invention.

FIG. 2B is a side view illustrating a face of left wall 212 of FIG. 2A that is not visible in that figure, according to an embodiment of the present invention. Left wall 212 differs from right wall 212 in this embodiment. However, per the above, in some embodiments, at least two walls may be the same. Left wall 212 includes an electromagnet 218, as well as its own power connector. As such, other cells may provide power to and/or receive power from cell 200 regardless of which wall they interlock with. Since magnets 216 are provided on all sides, cell 200 may interlock with another cell on any face.

Left wall 212 further includes a power connector 242 and a service port 244. Service port includes various connectors 245 that may serve as "plumbing" between adjacent cells, carrying power, signal lines, heat, etc. between cells. Any suitable current, heat, and/or material may be transferred between adjacent cells without deviating from the scope of the invention.

Feed lines (not shown) connect to power connector 242 and connectors 245. Such feed lines may also connect to various valves and control cards in the cell housing. Some embodiments of the present invention assume two modes of communication between the cells—a primary mode and redundant system mode. The primary mode may be via wireless cell-to-cell communication (e.g., 802.11 standard family communications). However, redundancy may be built into the system for a hardwire signal interconnect via connector 244 (i.e., wired communication). The dual COMM system is beneficial in some embodiments since control of a cell is needed during spacecraft configuration changes (e.g., topological), where a cell may have to be detached, hop over another cell, and re-attach. In this case, control may be fully exercised via the primary wireless scheme.

In some embodiments, chemical propellant may be used to affect free-flying maneuvers. The cost, measured in propellant mass loss, is relatively high for maneuvers in LEO, but less in GEO. Consequently, some embodiments use approaches to affect maneuvers that change spacecraft topology using reaction wheels, torque rods, and/or electromagnetics.

Figure 3A:
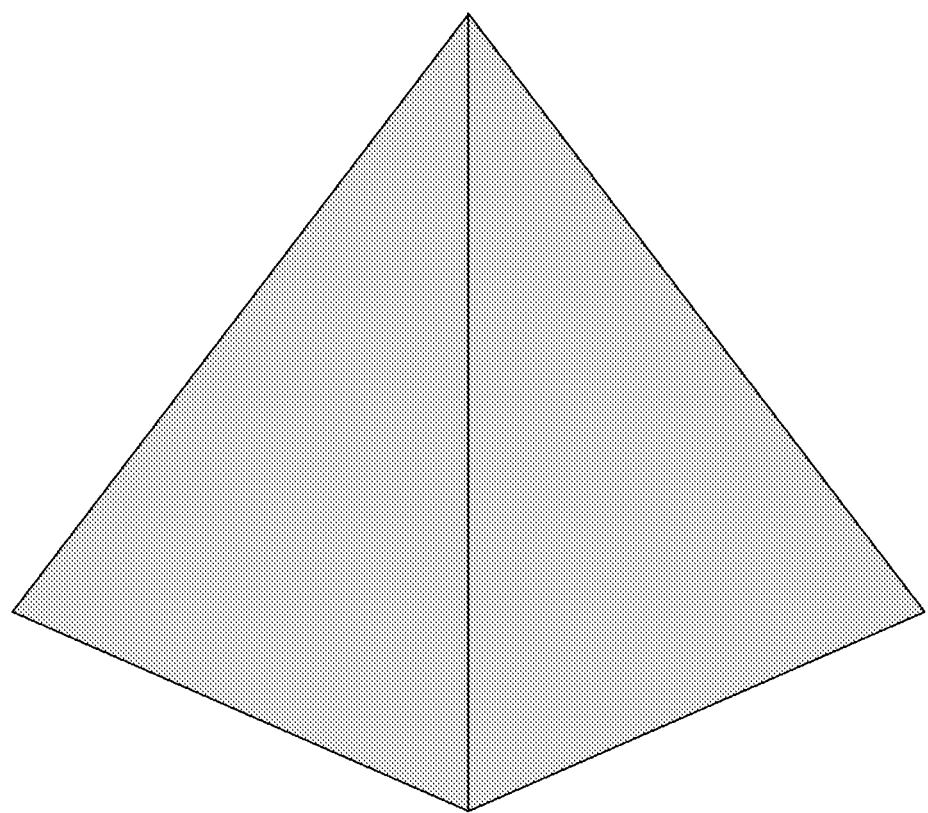
FIG. 3A is a perspective view illustrating a solid pyramid-shaped frame, according to an embodiment of the present invention.
Figure 3B:
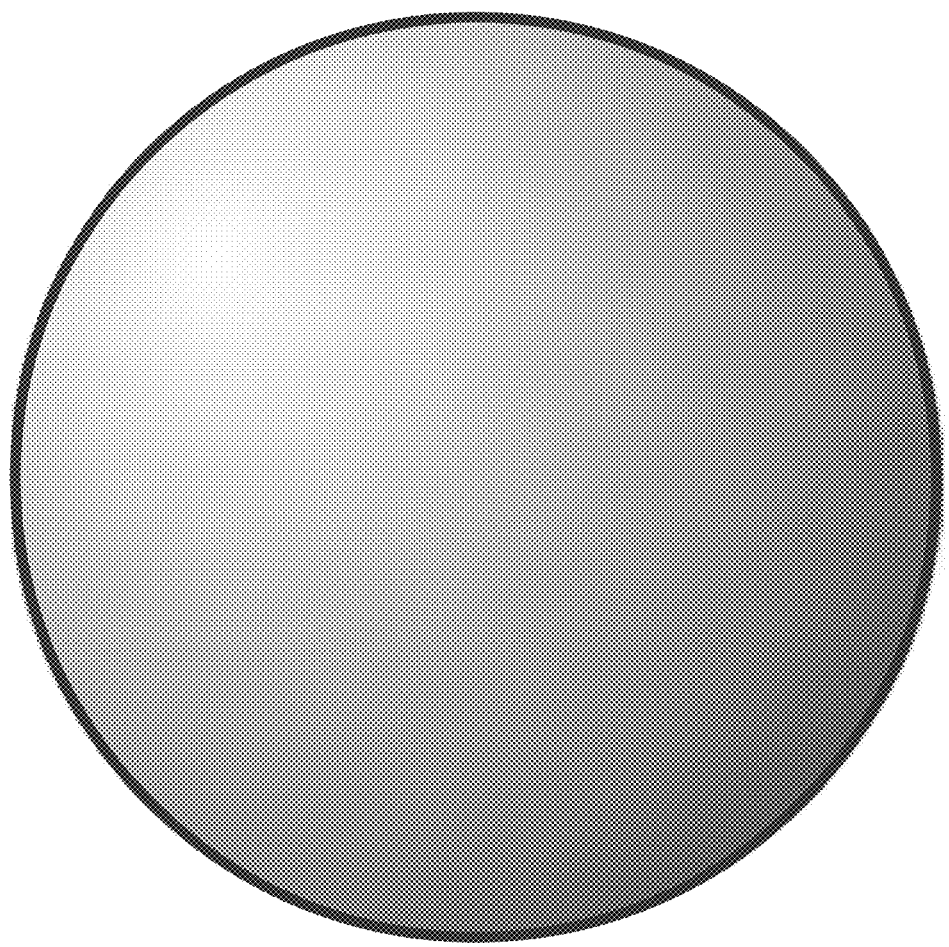
FIG. 3B is a side view illustrating a solid spherical frame, according to an embodiment of the present invention.

While a cube-shaped frame is shown in FIGS. 1 and 2A, any desired frame shape may be used without deviating from the scope of the invention, whether regular or irregular. For instance, cells may be pyramid-shaped, spherical-shaped, cylindrical, pill-shaped, torus-shaped, a set of nested rings, any polyhedron, etc. For instance, a pyramid structure 300 and a spherical structure 310 are shown in FIGS. 3A and 3B, respectively. Faces may be flat, curved, or both, depending on the shape. In the case of Also, at least some cells may have different shapes from at least some other cells in some embodiments. Each face (if there are faces) may be solid, open, or partially open.

Other articulated shapes are possible in some embodiments by invoking origami/kirigami techniques. In these embodiments, there may be a stowed shape (for high density packing during launch) and an open or partially open shape when place in orbit. These frame shapes may be chosen based on the combination of payloads/sensors that are to be included within the frame and the unique physical requirements of each.

FIGS. 1, 2A, and 2B describe an embodiment that is based on a cube frame shape. Other prismatic shapes (pyramid, dodecahedron, etc.) may follow the same general logic presented in FIGS. 1, 2A, and 2B. A sphere may be a more versatile frame shape that (depending on size) enables more flexibility. FIGS. 4A-7 disclose embodiments that are based on a spherical frame.

Figure 4A:
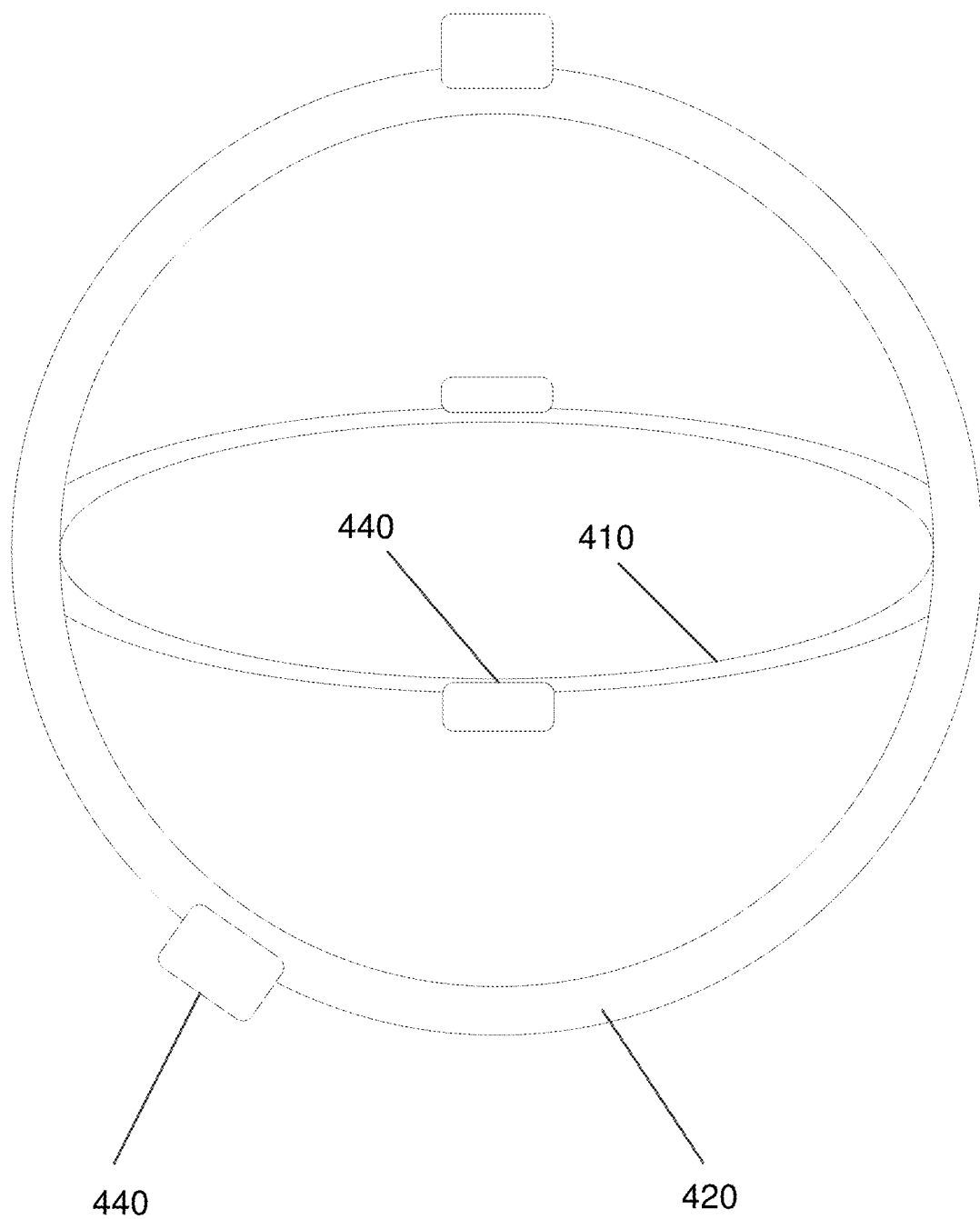
FIG. 4A is a perspective view illustrating a hollow spherical frame with two ring-shaped rails on the x-axis and y-axis, according to an embodiment of the present invention.

FIG. 4A is a perspective view illustrating a hollow spherical frame 400 with two ring-shaped rails 410, 420 on the x-axis and y-axis, respectively, according to an embodiment of the present invention. Motorized, magnetic tractors 440 move about the outsides of rails 410, 420, enabling frame 400 to connect with other frames in a manner that may still allow rails 410, 420 to be rotated along the respective ring. However, if multiple tractors are connectors are connected to other frames, such movement may also change the position/orientation of the other connected frames as well. Any number of tractors 440 may be used without deviating from the scope of the invention.

In this embodiment, the terms rails, motion guides, and tractors mean the following. The rails define a path of motion that can be instantiated in a physical form as a metallic rail, for instance. A motion-guide defines a path using electromagnets, for example, such that the tractor may move along the path. The tractor is defined as a mobile unit that is coupled to and/or moves along the rail according to the rail path, or moves along the motion-guides. The tractor need not be physically attached, but could be magnetically hovering. Moreover, the rails need not be a physical entity because in space, without gravity, tractors can be designed to move on light-path rails (e.g., a laser beam), for example. For conceptual understanding of the proposed concept, physical rails and tractors that are physically attached are explained in further detail.

Figure 4B:
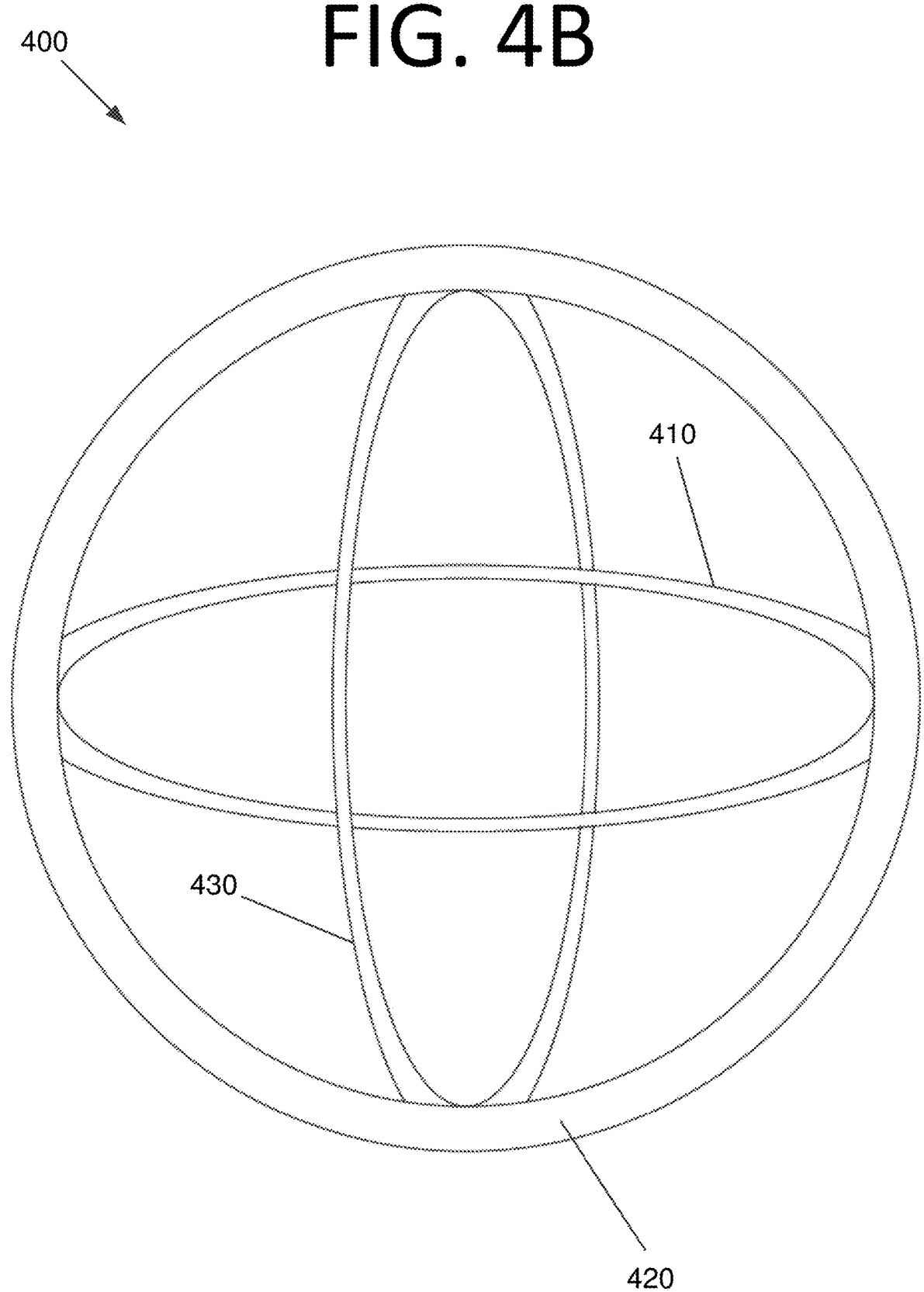
FIG. 4B is a perspective view illustrating a hollow spherical frame with three ring-shaped rails on the x-axis, y-axis, and z-axis, according to an embodiment of the present invention.

Also, any number of rings or rails of any shape or any combination of shapes may be used without deviating from the scope of the invention. For instance, FIG. 4B illustrates hollow spherical frame 400 with three ring-shaped rails 410, 420, 430 on the x-axis, y-axis, and z-axis, respectively. However, rails may be arranged along any axis, may be irregular in shape, etc. Components, such as those shown in FIG. 2A, may be connected to one or more rails. For instance, a rotatable component housing may enable components to rotate along any desired axis.

Figure 5A:
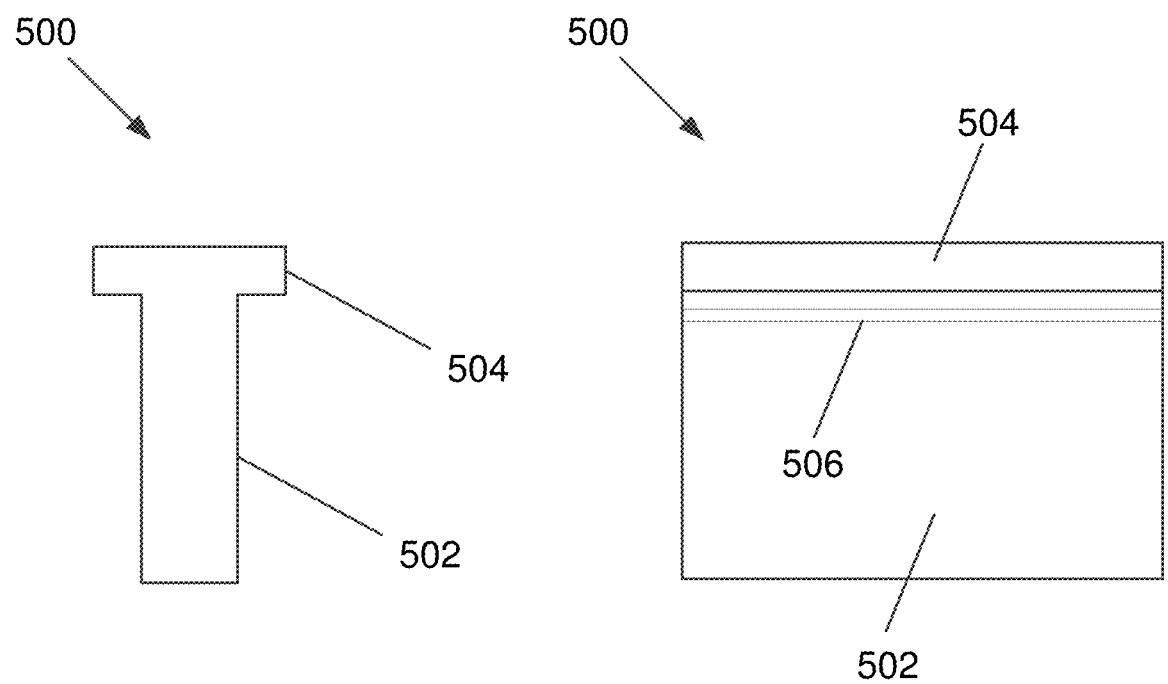
FIG. 5A illustrates cutaway (left) and side (right) views of a portion of a rail, according to an embodiment of the present invention.

FIG. 5A illustrates cutaway (left) and side (right) views of a portion of a rail 500, according to an embodiment of the present invention. In this embodiment, rail 500 has a narrower main body section 502 and a wider tractor retaining section 504. Conductors 506, such as conductive metal wires, provide power, and possibly digital commands, to a tractor, such a tractor 600 of FIG. 6A. The tractor, would be held in place by tractor retaining section 504. The tractor may then move about rail 500 using wheels, magnets, or any other suitable mechanism or mechanisms without deviating from the scope of the invention.

Figure 5B:
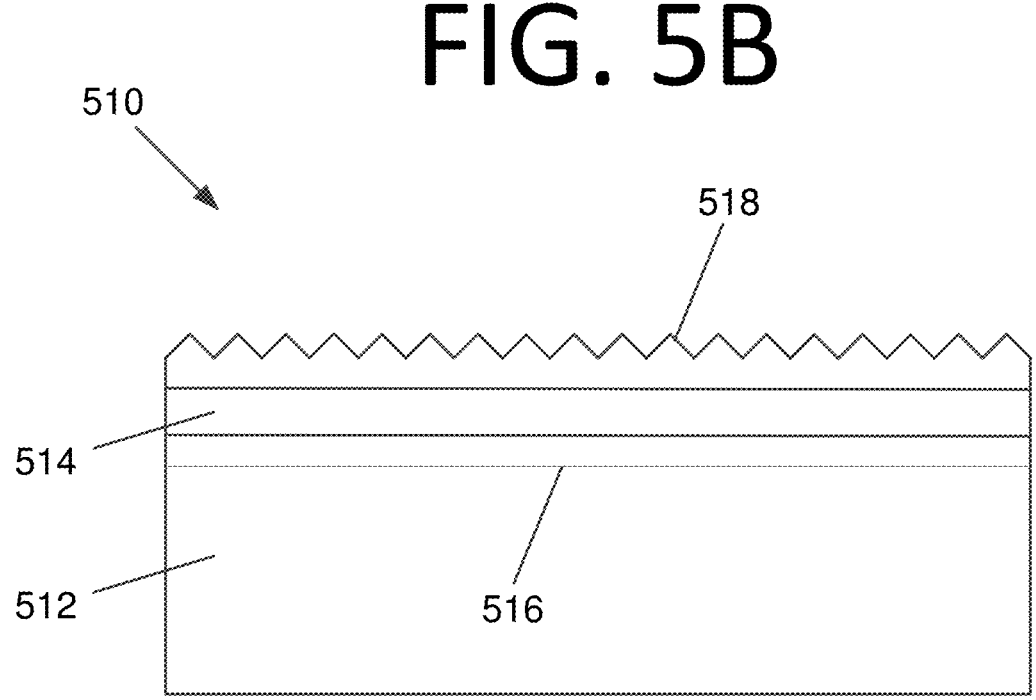
FIG. 5B is a side view illustrating a portion of a rail, according to an embodiment of the present invention.

In some embodiments, the rail may include teeth for engagement with a gear of one or more tractors. Such a rail 510 is depicted in FIG. 5B. Similar to rail 500 of FIG. 5A, rail 510 has a narrower main body section 512, a wider tractor retaining section 514, and a conductor 516. However, rail 510 also includes teeth 518 to be engaged by one or more tractors, such as tractor 610 of FIG. 6B.

Rail 510 could also be marked with a sequential, but not connecting, series of electromagnetics that essentially serve the role of "teeth" 518 by providing a force that enables the tractor to move along the rail. The concept follows electromagnetic techniques used in brushless motors. The electromagnetic approach enables the precision tractor motion to be accurate in the micrometer, and possibly in the nanometer, range.

Figure 6A:
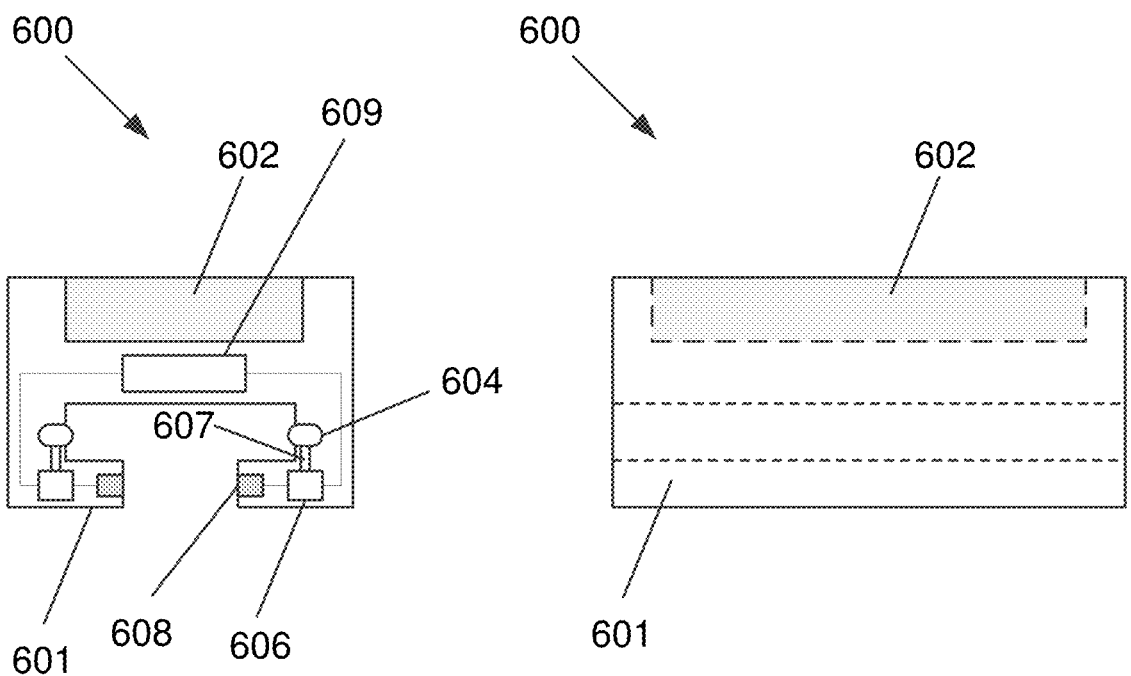
FIG. 6A illustrates cutaway (left) and side (right) views of a magnetic tractor, according to an embodiment of the present invention

FIG. 6A illustrates cutaway (left) and side (right) views of a magnetic tractor 600, according to an embodiment of the present invention. Tractor 600 includes retaining members 601 that hold tractor 600 in place on a retaining section of a rail. Tractor 600 also includes a magnet 602 that may engage with magnets of other frames and/or tractors. Tractor 600 also includes wheels 604 that contact the tractor retaining section of the rail. Wheels 604 are driven by brushless electric motors 606 via respective shafts 607. Electrical contacts 608 contact one or more wires of the rail.

Similarly, the connections of the tractor and the rail can follow an industry-proven direct drive linear motor (DDLM). A DDLM is a motor that is laid out flat and directly coupled to the driven load, eliminating the need for ball/lead screws, rack and pinions, belts/pulleys, and gearboxes. In some embodiments, rails, such as rails 410, 420, 430 of FIG. 4B, may be coupled to tractors configured as DDLMs.

In this embodiment, tractor 600 includes circuitry 609 that controls operation of tractor 600. For instance, circuitry 609 may include, but is not limited to, a microcontroller, a transceiver, or any other suitable circuitry without deviating from the scope of the invention. In certain embodiments, no control circuitry may be present, and brushless electric motors 606 may be controlled by providing power to the conductor(s) of the rail to drive brushless electric motors 606.

Figure 6B:
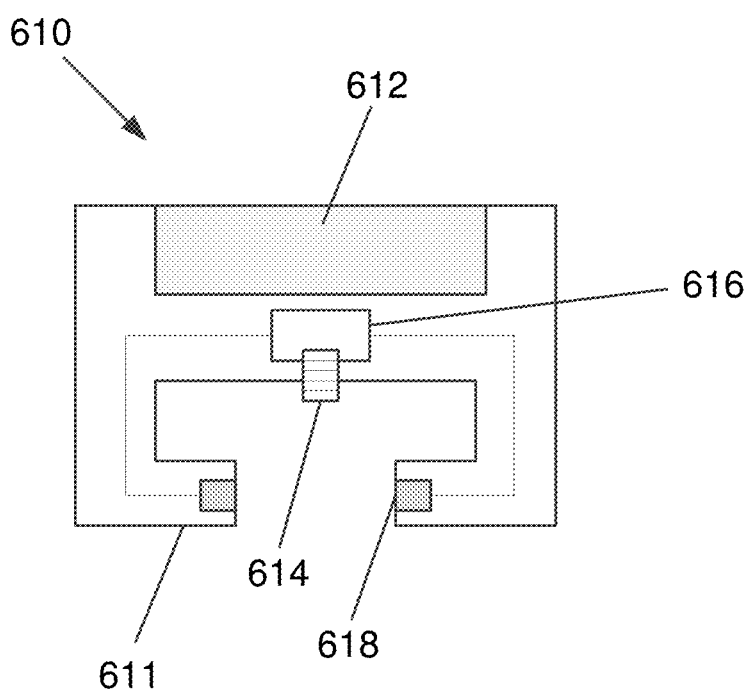
FIG. 6B illustrates a cutaway view of a magnetic tractor, according to an embodiment of the present invention.

FIG. 6B illustrates a cutaway view of a magnetic tractor 610, according to an embodiment of the present invention. Similar to magnetic tractor 600 of FIG. 6A, tractor 610 includes retaining members 611, a magnet 612, and electrical contacts 618. However, in this embodiment, a motor 616 is powered directly by conductor(s) of the rail and engages with teeth of the rail via gear 614. Motor 616 rotates gear 614, moving tractor 610 along the rail. Moreover, if a DDLM concept is used, tractor 610 in FIG. 6B would not need to include gears 614 or motors 616. In some embodiments, power to tractor 610 can be supplied via the rails or via a low power laser beam located at the center of some rings (see, e.g., FIG. 4B) where the laser beam light is directed via fast moving mirrors (e.g., galvanometer) to spot the light onto a power converter (light to electricity—not shown) located on the tractor.

Figure 7A:
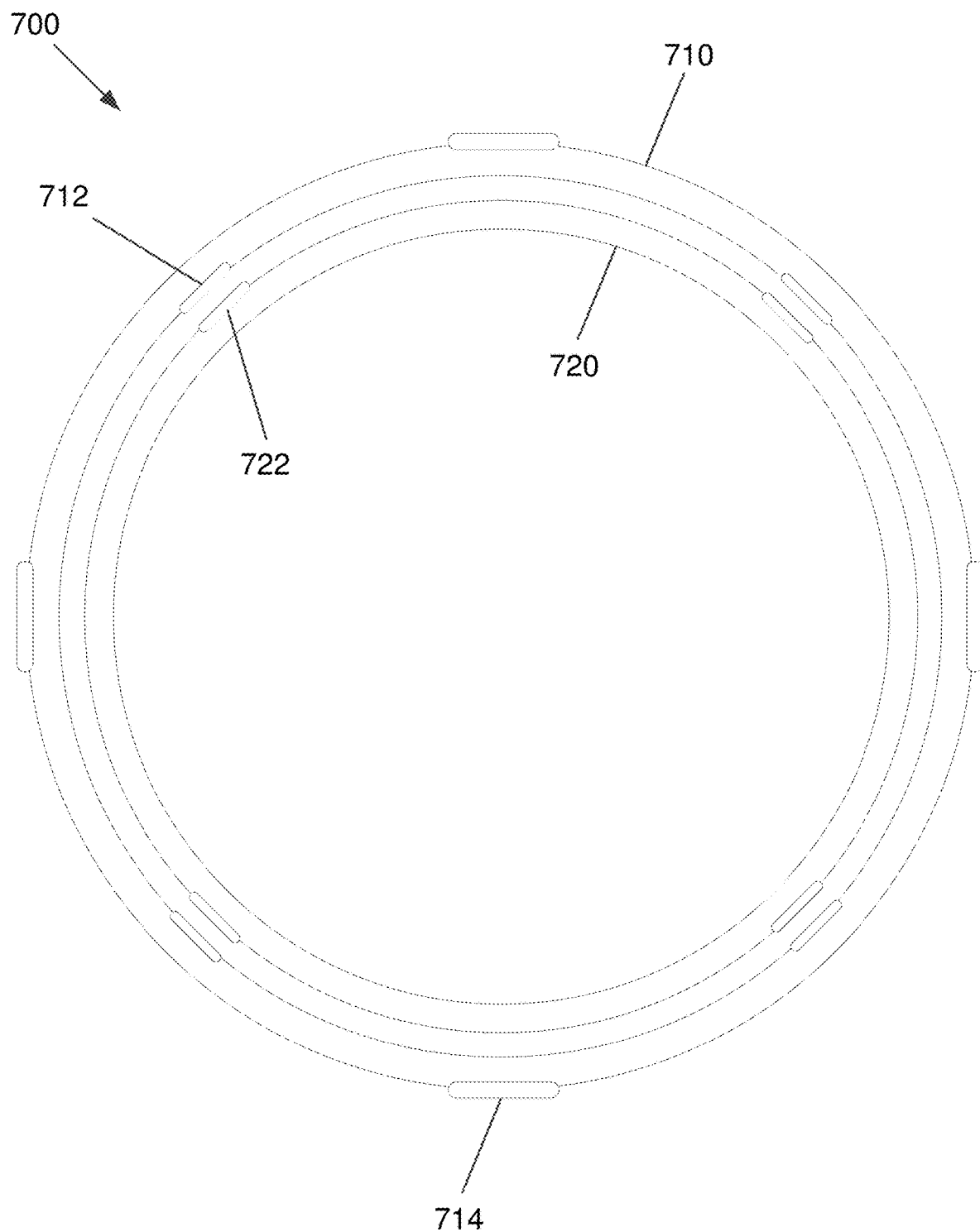
FIG. 7A is a side cutaway view illustrating a nested sphere frame, according to an embodiment of the present invention.

FIG. 7A is a side cutaway view illustrating a nested sphere frame 700, according to an embodiment of the present invention. Nested sphere frame 700 includes an outer sphere 710 with magnets 712, 714 located at various locations therearound. Magnets 712 are located on the inside of outer sphere 710, and magnets 714 are located on the outside of outer sphere 710 and configured to facilitate with attaching to other cells. Nested sphere frame 700 also includes an inner sphere 720 with magnets 722 located at various locations therearound.

Magnets 722 of inner sphere 720 are attracted to or repelled by magnets 712 of outer sphere 710. For instance, in some embodiments, magnets 712 may be fixed rare Earth metal magnets and magnets 722 may be electromagnets such that polarities of magnets 722 may be altered. By shutting off or changing the current in one or more of electromagnets 722, inner sphere 720, outer sphere 710, or both, may be caused to rotate as desired. Internal components, similar to those of FIG. 2A in some embodiments, may consequently be rotated to the desired orientation. In some embodiments, outer sphere 710 and/or inner sphere 720 may be fully or partially transparent. For instance, spheres 710, 720 may be constructed from tempered glass, acrylics, or any other suitable material such that light may reach internal components and/or transmissions may be sent out from internal components. In some embodiments, the nested spheres may be a set of nested Hoberman expanding spheres, where they are partially collapsed during launch, but expand upon reaching orbit.

In some embodiments, cells may be fully or partially folded in a manner conceptually similar to kirigami (i.e., folding of patterned flat shapes). Such cells may then open/take another shape once in space. Such a cell may also perform partial folds to change faces of the cell on the fly. As discussed herein, fully folding means the cell is folded on launch, but not unfolded all the way out once deployed. For instance, the cell may hold in some partial position and keep that structure.

Consider a number joined cells that are partially unfolded, but can further unfold cooperatively. In this approach, various fold facets will face in a particular direction, allowing for multisensory data acquisition. As the structure is unfolded a bit more, other facets have directivity to a target, allowing for other kinds of sensory measurements. The ensemble may be somewhat analogous to a Hoberman sphere (which is an isokinetic structure) when it is undergoing an expansion/contraction.

Figure 7B:
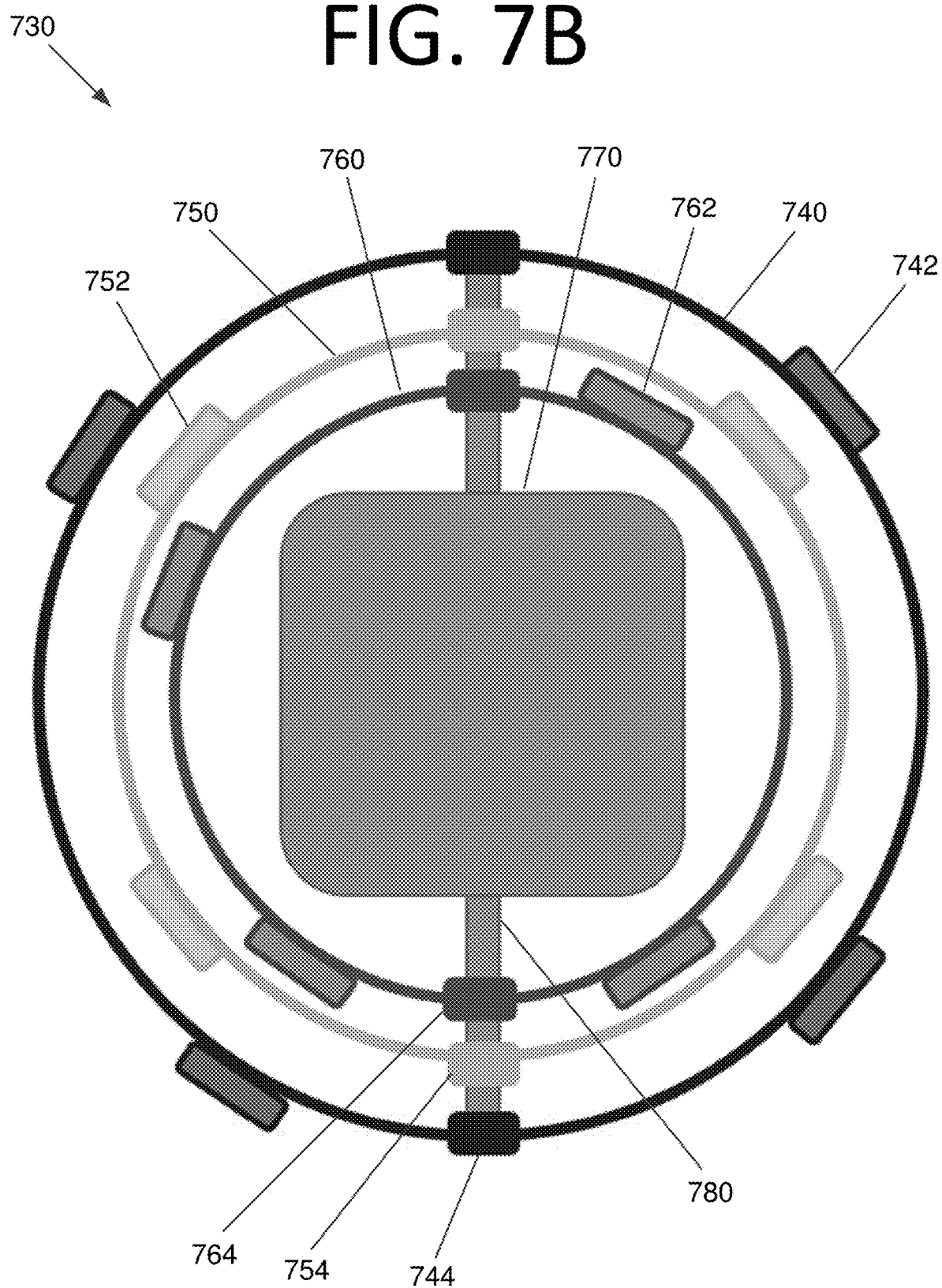
FIG. 7B is a side cutaway view illustrating a nested ring frame supporting a center structure, according to an embodiment of the present invention.

FIG. 7B is a side cutaway view illustrating a stowed configuration of a nested ring frame 730, according to an embodiment of the present invention. In this embodiment, three nested rings—an outer ring 740, a middle ring 750, and an inner ring 760—are included in nested ring frame 730. However, any number of nested rings (e.g., 2 rings, 10 rings, etc.) may be used without deviating from the scope of the invention. As used herein, "rings" may be any ring or hoop-like structure, and the rings need not be perfectly spherical (e.g., elliptical, irregular, etc.), so long as the rings nest within one another. Indeed, different rings may have different shapes from one another.

Outer ring 740 is called the "frame ring" in this embodiment and includes tractors 742 that have frame-connecting capabilities (i.e., tractors 742 provide a connection mechanism). Tractors 742 may move under motorized control on ring 740 along physical, electromagnetic, or light-guided tracks, for instance. Tractors 742 may pass power, data, etc.

from ring 740 to another cell that has a frame and a frame-connecting structure. Outer ring 740 can rotate 360 degrees about shaft 780 in this embodiment via motors 744.

Nested within outer ring 740 is a middle ring 750 that can also rotate about shaft 780 using its own motors 754. Within middle ring 750 is nested an inner ring 760, which can rotate about shaft 780 via motors 764. Motors 744, 754, 764 are shown attached to a single shaft 780 in this embodiment, but that need not be the case in other embodiments. For example, shaft 780 may connect motors 744, 754 as shown, but another shaft (not shown) that is connected to a power and control structure 770, but exits at 90 degrees to shaft 780, may be connected to inner ring 760, allowing inner ring 760 to rotate about a second rotational axis.

Middle ring 750 and inner ring 760 also have respective tractors 752, 762 that move along middle ring 750 and inner ring 760 to a desired location. In the center is a power and control structure 770 that includes batteries, processing and control circuitry, power control, and ancillary devices to run the sensors (i.e., payloads) and to move tractors 742, 752, 762. Tractors 752, 762 may include sensors or payloads in some embodiments that capture power from the rail (i.e., ring 750 or 760) and can transmit data along the rail or wirelessly to center power and control structure 770 in some embodiments. Power and data may be provided via a conductor, similar to that shown in FIGS. 5A and 5B. Shaft 780 may also include a conductor (not shown) that provides power and data between rings 740, 750, 760 and power and control structure 770. Power and control structure may house similar components to those shown in FIG. 2B, for instance.

The embodiment of FIG. 7B shows the flat configuration when stowed or during launch. Upon arriving in orbit, rings 740, 750, 760 may rotate out of the stowed flat plane to any desired angle, while ring 740 and tractors 742 may rotate/move to enable interconnection with another cell. As with other embodiments, various cells may be joined together to form an ensemble of cells having a desired structure.

Figure 8A:
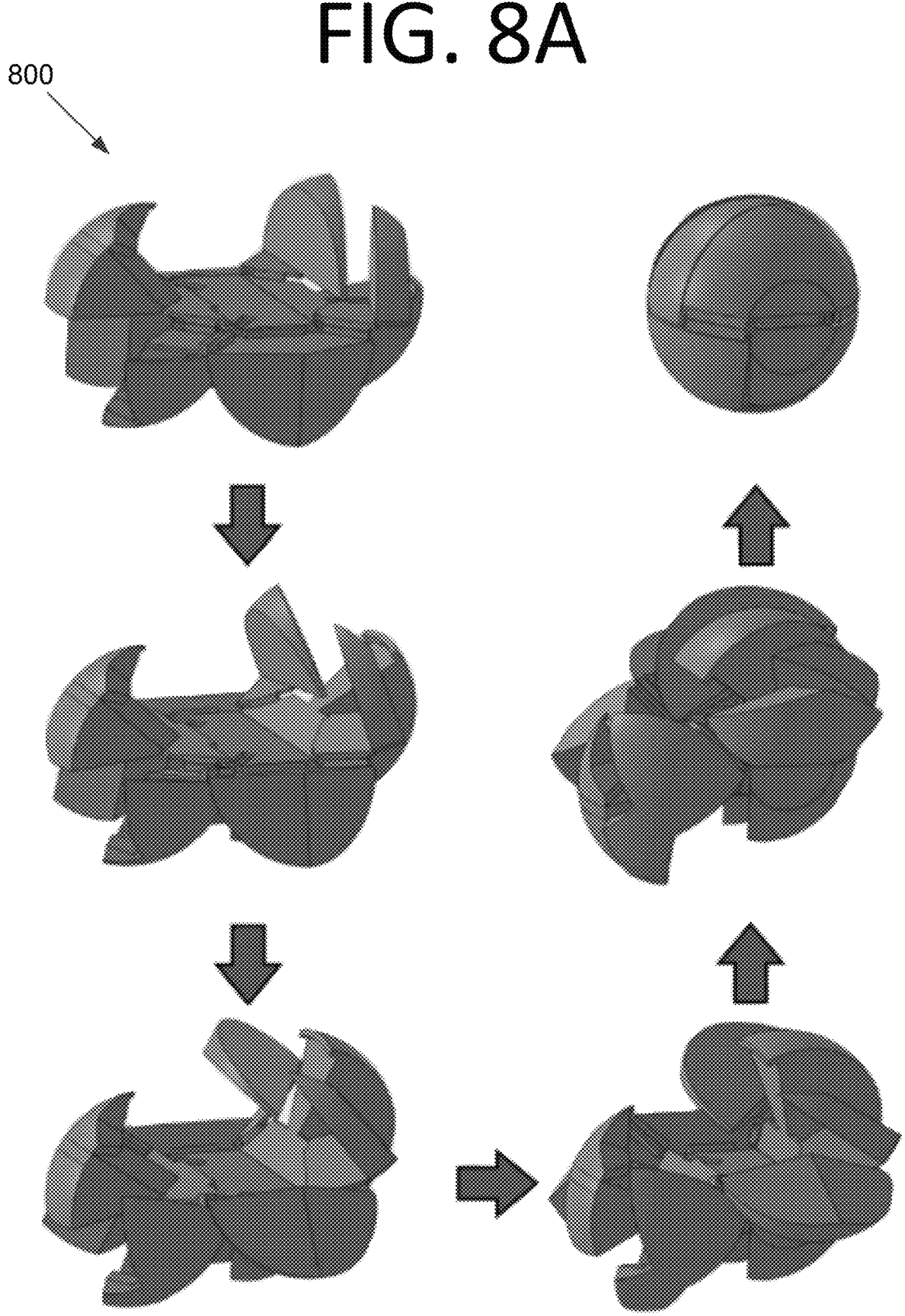
FIG. 8A illustrates thick offset panels transforming into a sphere using origami techniques.
Figure 8B:
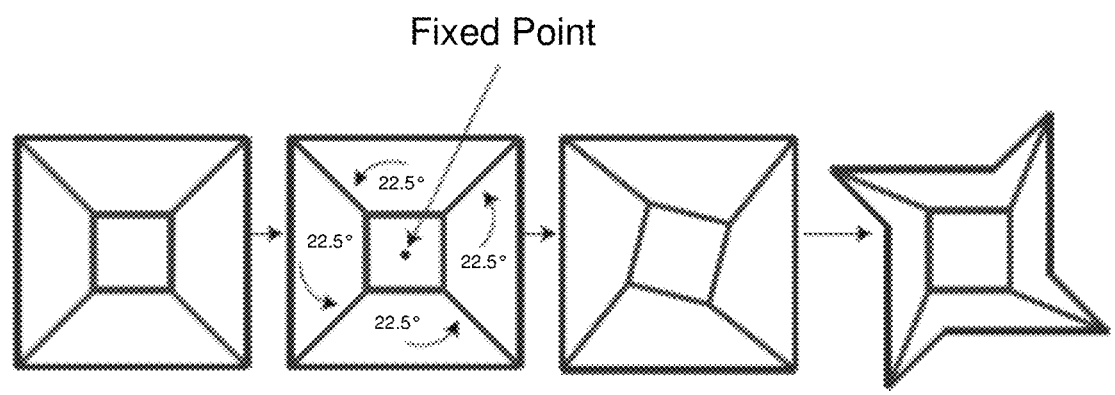
FIG. 8B illustrates twisting an origami structure to make a pinwheel.

FIG. 8A illustrates thick offset panels 800 transforming into a sphere using origami techniques. As can be seen, the multiple panels transition from an irregular initial shape in the upper left image to a spherical shape in the upper right image. This image is from M. R. Morgan and R. L. Lang, "Towards developing product applications of thick origami using the offset panel technique," Mech. Sc. 7, pp. 69-77 (2016), which is incorporated herein by reference and provides further details. FIG. 8B illustrates twisting an origami structure 810 to make a pinwheel. This image is taken from Edwin A. Peraza-Hernandez, Darren J. Hartl, Richard J. Malak Jr., and Dimitris C. Lagoudas, "Origami-Inspired Active Structures: A Synthesis and Review," Smart Materials and Structures DOI: 10.1088/0964-1726/23/9/094001 (August 2014), which also incorporated herein by reference.

Such folding applications are also envisioned for space vehicles, the design and application of which is novel. When a foldable origami-inspired structure begins to open, the point direction of the "faces" moves and in various partially opened states, and a select number of faces point in a particular direction. Moreover, as the structure is further opened, these faces point to a different direction, while other faces "come into view."

Figure 9A:
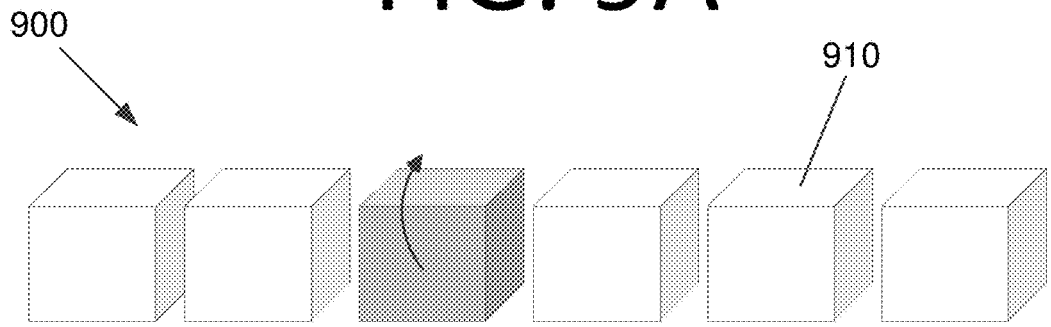
FIG. 9A illustrates an array of six cube-shaped cells arranged in a "line," according to an embodiment of the present invention.

Various configurations are possible with embodiments of the present invention. The cube shape is used to readily illustrate the concepts herein, and embodiments are not limited to a cube configuration. For instance, FIG. 9A illustrates an array 900 of six cube-shaped cells 910 arranged in a "line". Here, the darker shaded cell rotates such that the face currently facing outwards is facing up (i.e., the whole cell is able to rotate). The remaining cells remain fixed.

Figure 9B:
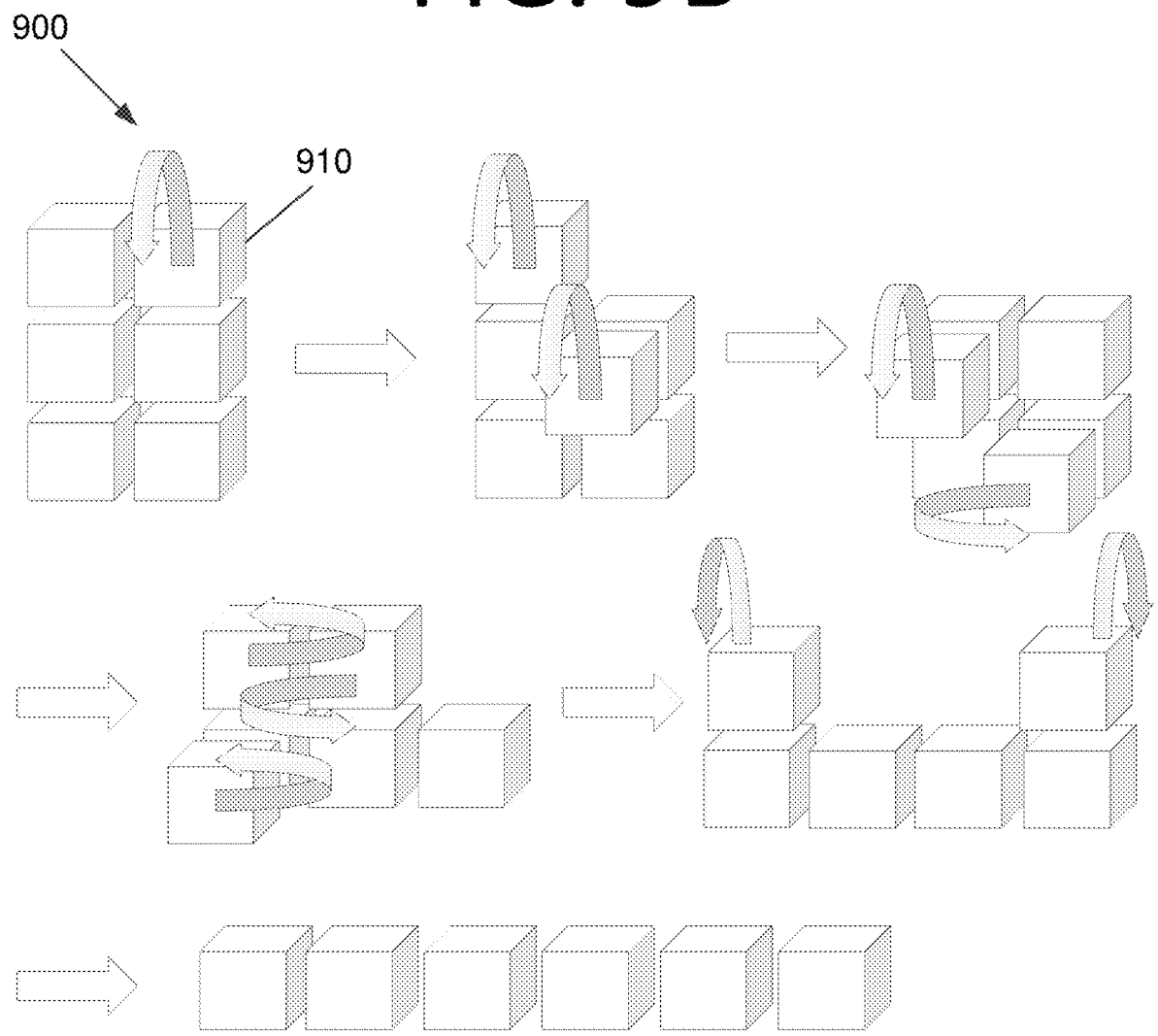
FIG. 9B illustrates the array of six cubes-shaped cells rearranged in different configurations, according to an embodiment of the present invention.

More complex rearrangements are also possible. For instance, FIG. 9B illustrates array 900 of cells 910 transforming from an N×N array into a line. Individual cells 910 rotate such that they are adjacent to other cell faces. In this manner, array 900, which initially is arranged in three rows of two cells, changes topology to form a single row of six cells. The topology changes are affected not by full detachment and free-flying maneuvers, but by rotating about the magnetic/electromagnetic "hinges" using reaction wheels (and possibly with abrupt braking) to provide a momentum impetus in this embodiment.

Figure 10:
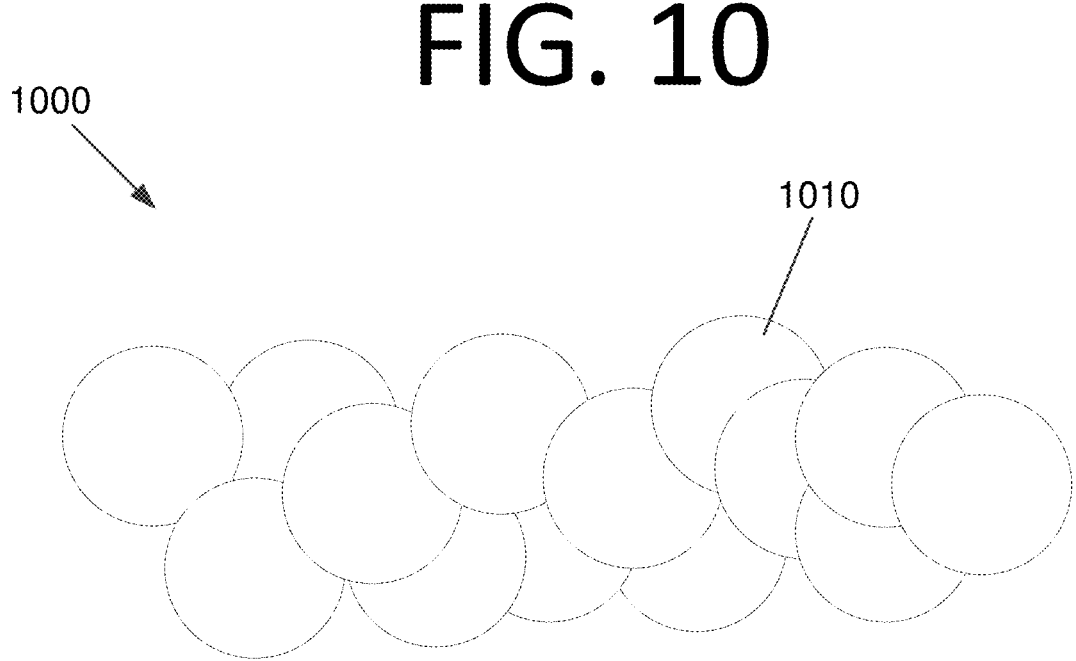
FIG. 10 is a side view illustrating an array of spherical cells, according to an embodiment of the present invention.

FIG. 10 is a side view illustrating an array 1000 of spherical cells 1010, according to an embodiment of the present invention. In this embodiment, cells 1010 may be similar in design to that shown in FIGS. 7A or 7B. Magnets within a cell may be rotated to line up with magnets of other, adjacent cells. In this manner, cells may "roll" around one another and take shapes that may resemble molecules (e.g., a polymer). Moreover, FIG. 10 demonstrates a possible interconnection with the embodiment shown in FIG. 7B, in which the cells are connected by tractors (one on each ring frame structure). FIG. 10 demonstrates that the ensemble could have morphology or topology that is not prismatic.

In some embodiments, cells may be deployed into space without a mission or with an incomplete mission. The cells could then be programmed on orbit to perform a desired mission, or to change their current mission. Furthermore, considerably larger and different structures may be built in a microgravity environment than is possible on Earth.

In some embodiments, the cells may be "driven" and made to join a large truss construct (e.g., 1 km in length) that has already been placed in orbit. In such embodiments, the cells may attach to the truss using the truss for both mechanical support and utilities (e.g., power, signal, communications, propellant transfer, heat transfer, etc.). The connections to the truss may be similar to the connection between the cells themselves. In some embodiments, the cells carry a truss portion during the launch and, upon connection with other cells, a large backbone truss is formed that serves as a mechanical support and utilities for the growing system "organism."

Figure 11:
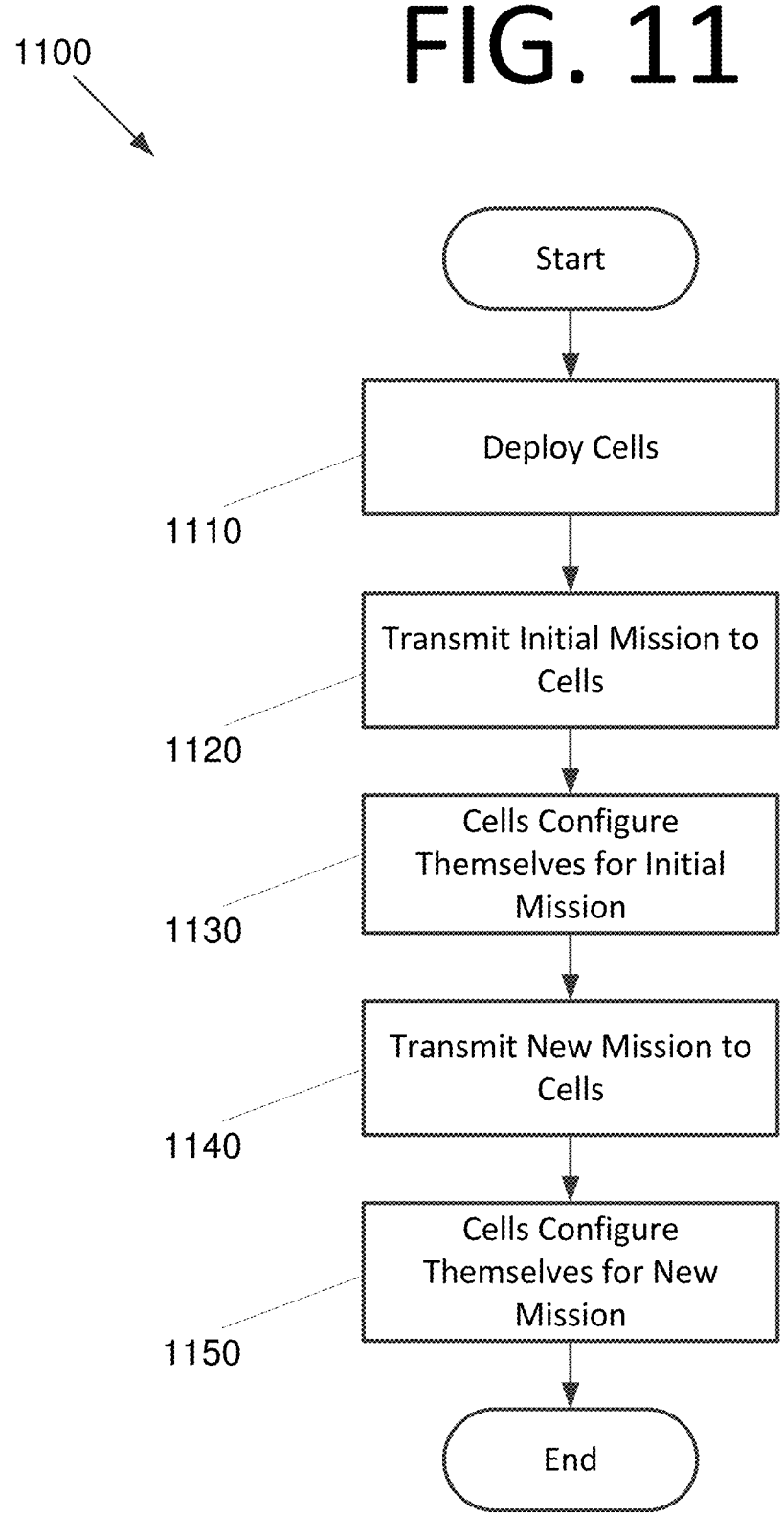
FIG. 11 is a flowchart illustrating a process for deploying and reconfiguring a cell-based space system, according to an embodiment of the present invention.

FIG. 11 is a flowchart 1100 illustrating a process for deploying and reconfiguring a cell-based space system, according to an embodiment of the present invention. The process begins with deploying cells at 1110. For instance, cells may be launched into space and deployed by a delivery vehicle, dispenser, or be placed into orbits where their own propulsion capability, coupled with attitude control (via star trackers), propels them to a meeting location. The cells join to form a particular construct. An initial mission is then transmitted to the cells at 1120. The cells receive the mission and configure themselves in accordance thereto at 1130. For instance, if the cells are tasked with forming a communications array, they may orient themselves in a planar configuration and orient their communications faces (or rotate the communications equipment within each cell) such that they are all facing the same direction.

A new mission is then transmitted to the cells at 1140. The cells then receive the new mission and configured themselves accordingly at 1150. This process may be repeated as often as desired to cause cells to partially disengage/hop/rotate to carry out any desired mission.

Figure 12:
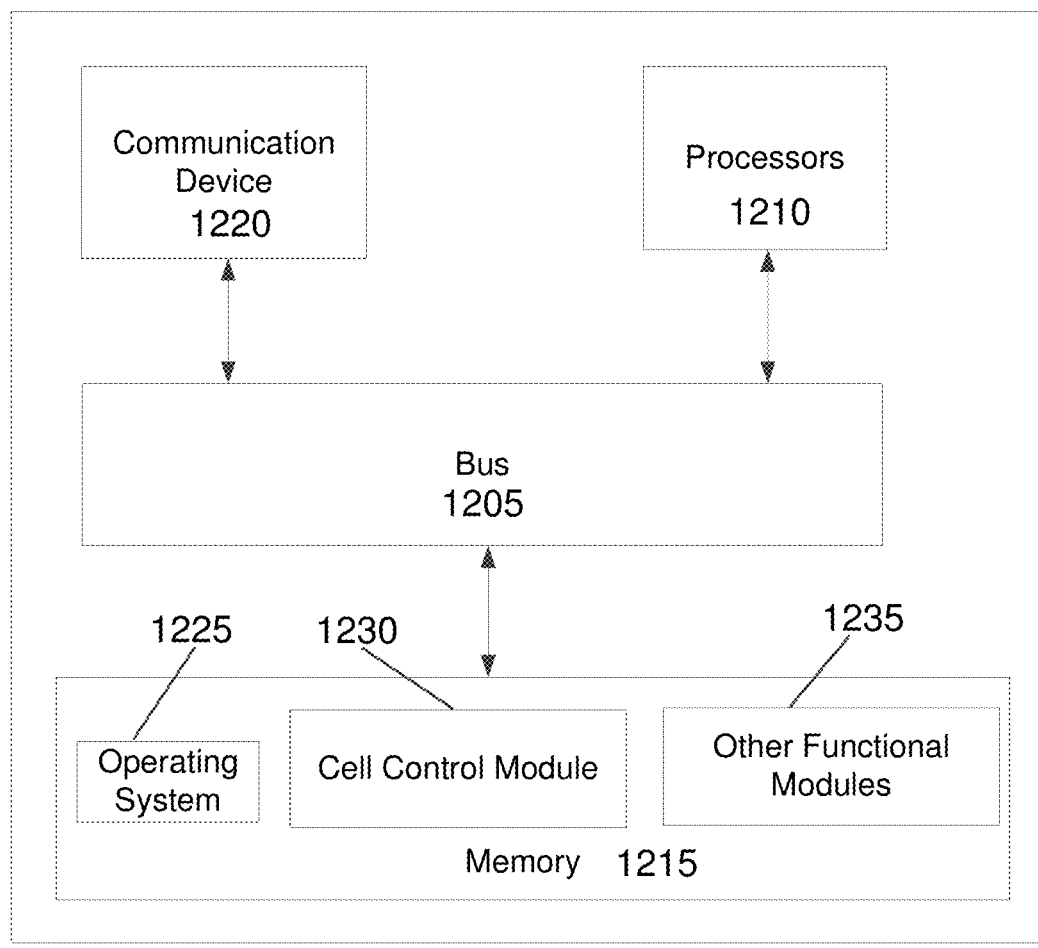
FIG. 12 is a block diagram illustrating a computing system configured to control operation of a cell, according to an embodiment of the present invention.

FIG. 12 is a block diagram illustrating a computing system configured to control operation of a cell, according to an embodiment of the present invention. Computing system 1200 includes a bus 1205 or other communication mechanism for communicating information (e.g., a "local cloud" that is not actually physical hardware), and processor(s) 1210 coupled to bus 1205 for processing information. Communication could be wireless, hardwired, or for large satellite structures via laser telemetry in some embodiments. Processor(s) 1210 may be any type of general or specific purpose processor, including a central processing unit (CPU), a graphics processing unit (GPU), an application specific integrated circuit (ASIC), a field programmable gate array (FPGA), or any combination thereof. Processor(s) 1210 may also have multiple processing cores, and at least some of the cores may be configured to perform specific functions. Multi-parallel processing may be used in some embodiments. Computing system 1200 further includes a memory 1215 for storing information and instructions to be executed by processor(s) 1210. Memory 1215 can be comprised of any combination of random access memory (RAM), read only memory (ROM), flash memory, cache, static storage such as a magnetic or optical disk, or any other types of non-transitory computer-readable media or combinations thereof. Memory 1215 may be located on a cell, on the ground (i.e., Earth), in the internet cloud, or any combination thereof. Additionally, computing system 1200 includes a communication device 1220, such as a transceiver and antenna, to wirelessly provide access to a communications network.

The software architecture for the cell ensemble may be distributed, invoking mobile software that serves to not only provide control and make the system adaptable to configuration changes, but also to protect against cyberattacks (e.g., loss and replacement of cells, isolation of "bad actors," or ineffectual cells). The control scheme envisioned for the whole ensemble in some embodiments may operate on a quorum of cells (not necessary conjoined), which are given control for one particular satellite function (e.g., attitude control, thermal control, communication control, imaging data acquisition and analysis, data downlink, etc.). The quorum may dynamically elect a leader. The group of leaders control critical satellite functions, and by consensus, conduct the satellite missions.

Non-transitory computer-readable media may be any available media that can be accessed by processor(s) 1210 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Memory 1215 stores software modules that provide functionality when executed by processor(s) 1210. The modules include an operating system 1225 for computing system 1200. The modules further include a cell control module 1230 that is configured to facilitate cell operations by employing any of the approaches discussed herein or derivatives thereof. Computing system 1200 may include one or more additional functional modules 1235 that include additional functionality.

One skilled in the art will appreciate that a "system" could be embodied as an embedded computing system, a computer, a server, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data. Memory may be located on a cell, on the ground (i.e., Earth), in the internet cloud, or any combination thereof.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process steps performed in FIG. 11 may be performed by a computer program, encoding instructions for a processor to perform at least the process described in FIG. 11, in accordance with embodiments of the present invention. The computer program may be embodied on a non-transitory computer-readable medium. The computer-readable medium may be, but is not limited to, a hard disk drive, a flash device, RAM, a tape, or any other such medium used to store data. Memory may be located on a cell, on the ground (i.e., Earth), in the internet cloud, or any combination thereof. The computer program may include encoded instructions for controlling the processor to implement the process described in FIG. 11, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an ASIC.

It will be readily understood that the components of various embodiments of the present invention, as generally described and illustrated in the figures herein, may be arranged and designed in a wide variety of different configurations. Thus, the detailed description of the embodiments of the systems, apparatuses, methods, and computer programs of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A cell, comprising:
a frame comprising a connection mechanism configured to facilitate connection of the cell with at least one other cell to enable assembly of larger structures based on a plurality of conjoined cells;
a plurality of components housed within and/or attached to the frame; and
a flight computer, wherein
the cell is a space vehicle,
the cell is configured to automatically interlock, unlock, and reconfigure itself with one or more other cells to collectively form a reconfigurable ensemble,
the plurality of components comprise reaction wheels with braking capability, and
the flight computer is configured to cause the reaction wheels to generate sufficient torque to disconnect the cell from an adjacent cell.

2. The cell of claim 1, wherein at least a portion of the frame is open.

3. The cell of claim 1, further comprising:
a rotatable component housing housed within or on the frame, the rotatable component housing rotatably connected to the frame and rotatable about at least one axis, wherein
the plurality of components are located on the rotatable component housing at different locations from one another, and
rotating the rotatable component housing orients each component to a new orientation.

4. The cell of claim 1, wherein the frame is spherically-shaped, pill-shaped, toms-shaped, polyhedral, of equal polygons, of unequal polygons, or a set of nested rings.

5. The cell of claim 1, wherein the frame comprises a plurality of open faces and a plurality of walls.

6. The cell of claim 5, wherein the plurality of open faces are defined by supports and an edge of at least one of the plurality of walls.

7. The cell of claim 6, wherein the frame comprises a plurality of hinges between at least one wall and at least one support, the plurality of hinges configured to enable the frame to be at least partially collapsed or folded.

8. The cell of claim 6, wherein the connection mechanism comprises magnets or electromagnets located on the plurality of walls and the supports.

9. The cell of claim 1, wherein the connection mechanism comprises a plurality of rotatable mechanical or electromechanical interlocks, a ball bearing type locking mechanism, or any combination thereof.

10. The cell of claim 1, wherein the frame comprises a passive or active thermal conducting mechanism.

11. The cell of claim 1, further comprising:
solar cells configured to provide electricity;
at least one battery operably connected to the solar cells and configured to provide power to the cell; and
at least one power connector configured to provide power to, and receive power from, adjacent cells.

12. The cell of claim 1, further comprising:
a plurality of thrusters configured to provide propulsion.

13. The cell of claim 1, further comprising:
a service port comprising a plurality of connectors, the plurality of connectors configured to carry power, communications signals, heat, propellant, or any combination thereof, to adjacent cells.

14. The cell of claim 1, wherein
the plurality of components comprise reaction wheels, and
the flight computer of the cell is configured to cause the reaction wheels of the cell to generate sufficient torque to controllably connect the cell to an adjacent cell.

15. The cell of claim 1, wherein
the plurality of components comprise reaction wheels, and
the flight computer of the cell, in concert with a flight computer and reaction wheels of least one other conjoined cell, are configured to cause the reaction wheels of the cell and the at least one other conjoined cell to produce a counter torque to stabilize the cell and the at least one other conjoined cell from disturbances when one cell is disconnecting from an adjacent cell.

16. The cell of claim 1, wherein
the cell is conjoined with a plurality of other cells to form a joined ensemble,
each cell of the plurality of cells comprises a flight computer and reaction wheels with braking capability, and
the flight computers of the plurality of cells are configured to control the reaction wheels of their respective cell to change the topology or shape of the ensemble by selective movement of individual cells via hopping, rotation, and/or "rolling" motion maneuvers along the joined ensemble.

17. The cell of claim 1, wherein
the frame comprises a plurality of rails, and
the connection mechanism comprises a plurality of tractors configured to move along a respective one of the plurality of rails.

18. The cell of claim 1, wherein the frame comprises:
an at least partially transparent outer sphere; and
an at least partially transparent inner sphere located within the outer sphere, wherein
the plurality of components are housed within the inner sphere,
the outer sphere and the inner sphere comprise a plurality of electromagnets configured to rotate the inner sphere when at least some of their polarities are switched such that orientations of the components may be changed, and
the connection mechanism is located on an outside of the outer sphere.

19. The cell of claim 1, wherein
the cell is configured to interlock with one or more other cells to collectively form an ensemble; and
the ensemble is broken into disjointed segments to perform a mission and is then regrouped and reconstituted.

20. A cell, comprising:
a frame comprising a connection mechanism configured to facilitate connection of the cell with at least one other cell;
a rotatable component housing rotatably connected to the frame, but is also configured to rotate about at least one axis; and
a plurality of components located on the rotatable component housing at different locations from one another, wherein
rotating the rotatable component housing orients each component in a new orientation, wherein
the cell is a space vehicle, and
the cell is configured to automatically interlock, unlock, and reconfigure itself with one or more other cells to collectively form a reconfigurable ensemble.

21. The cell of claim 20, wherein at least a portion of the frame is open.

22. The cell of claim 20, wherein the frame comprises a plurality of open faces and a plurality of walls.

23. The cell of claim 22, wherein the plurality of open faces are defined by supports and an edge of at least one of the plurality of walls.

24. The cell of claim 22, wherein the frame comprises a plurality of hinges between at least one wall and at least one support, the plurality of hinges configured to enable the frame to be at least partially collapsed or folded.

25. The cell of claim 22, wherein the connection mechanism comprises magnets located on the plurality of walls and the supports.

26. The cell of claim 20, wherein the connection mechanism comprises a plurality of rotatable mechanical or electromechanical interlocks, a ball bearing type locking mechanism, or any combination thereof.

27. The cell of claim 20, wherein the frame comprises an active or passive thermal conducting mechanism.

28. The cell of claim 20, further comprising:
solar cells configured to provide electricity;
at least one battery operably connected to the solar cells and configured to provide power to the cell; and
at least one power connector configured to provide power to, and receive power from, adjacent cells.

29. The cell of claim 20, further comprising:
a flight computer configured to maintain cell operations and control flight and mission operations; and
a plurality of thrusters configured to provide propulsion.

30. The cell of claim 20, further comprising:
a service port comprising a plurality of connectors, the plurality of connectors configured to carry power, communications signals, heat, propellant, or any combination thereof, to adjacent cells.

31. The cell of claim 20, wherein the plurality of components comprise reaction wheels and the cell further comprises a flight computer, the flight computer configured to cause the reaction wheels to generate sufficient torque to disconnect the cell from an adjacent cell.

32. The cell of claim 20, wherein the plurality of components comprise reaction wheels and the cell further comprises a flight computer.

33. The cell of claim 32, wherein the flight computer is configured to cause the reaction wheels to generate sufficient torque to controllably connect the cell to an adjacent cell.

34. The cell of claim 32, wherein
the plurality of components comprise reaction wheels, and
the flight computer of the cell, in concert with a flight computer and reaction wheels of least one other conjoined cell, are configured to cause the reaction wheels of the cell and the at least one other conjoined cell to produce a counter torque to stabilize the cell and the at least one other conjoined cell from disturbances when one cell is disconnecting from an adjacent cell.

35. The cell of claim 20, wherein
the cell is conjoined with a plurality of other cells to form a joined ensemble,
each cell of the plurality of cells comprises a flight computer and reaction wheels with braking capability, and
the flight computers of the plurality of cells are configured to control the reaction wheels of their respective cell to change the topology or shape of the ensemble by selective movement of individual cells via hopping, rotation, and/or "rolling" motion maneuvers along the joined ensemble.

36. A joined ensemble, comprising:
a plurality of cells, wherein
each cell of the plurality of cells comprises:
- a frame comprising a connection mechanism configured to facilitate connection of a respective cell of the plurality of cells with at least one other cell of the plurality of cells,
- a plurality of components housed within and/or connected to the frame, and
- a "flight" computer configured to control flight and mission operations of the respective cell of the plurality of cells and at least some functions of the joined ensemble, wherein the flight computers of the plurality of cells in the ensemble are configured to control the plurality of cells to automatically arrange themselves to perform a desired mission of the joined ensemble
the plurality of cells are space vehicles,
each cell of the plurality of cells comprises reaction wheels, and
the flight computers of the plurality of cells are configured to control the respective reaction wheels of their respective cell to change the topology or shape of the ensemble by selective movement of individual cells via hopping, rotation, and/or "rolling" motion maneuvers along the joined ensemble.

\* \* \* \* \*